US007477451B2

(12) United States Patent
Katz

(10) Patent No.: US 7,477,451 B2
(45) Date of Patent: Jan. 13, 2009

(54) DEVICES AND METHODS FOR PROVIDING WIDE FIELD MAGNIFICATION

(75) Inventor: Milton Katz, New York, NY (US)

(73) Assignee: The Research Foundation Of State University Of New York, Albany, NY (US)

( * ) Notice: Subject to any disclaimer, the term of this patent is extended or adjusted under 35 U.S.C. 154(b) by 0 days.

(21) Appl. No.: 10/991,917

(22) Filed: Nov. 18, 2004

(65) Prior Publication Data

US 2006/0103924 A1    May 18, 2006

(51) Int. Cl.
*G02B 25/00*    (2006.01)
*G02B 23/00*    (2006.01)

(52) U.S. Cl. .................... 359/481; 359/399; 359/431; 359/744

(58) Field of Classification Search ......... 359/362–366, 359/399–419, 618–630, 431, 831–837, 480–482, 359/744; 351/42–57
See application file for complete search history.

(56) References Cited

U.S. PATENT DOCUMENTS

| 3,329,818 | A |   | 7/1967  | Woehl ........................ 347/226 |
| 3,522,983 | A | * | 8/1970  | Daniels ..................... 359/481 |
| 3,729,152 | A | * | 4/1973  | Stephenson ............... 244/3.16 |
| 3,947,086 | A |   | 3/1976  | Hunzinger ................. 359/407 |
| 4,196,966 | A |   | 4/1980  | Malis ......................... 359/482 |
| 4,281,890 | A | * | 8/1981  | Van Exel .................... 359/418 |
| 4,540,238 | A |   | 9/1985  | Edwards ..................... 359/481 |
| 4,822,994 | A | * | 4/1989  | Johnson et al. ....... 250/214 VT |
| 5,000,556 | A | * | 3/1991  | Katsuma ..................... 359/407 |
| 5,052,790 | A |   | 10/1991 | Edwards et al. ............. 359/399 |
| 5,076,682 | A |   | 12/1991 | Pasfield ...................... 351/158 |
| 5,079,416 | A |   | 1/1992  | Filipovich ............ 250/214 VT |
| 5,229,598 | A |   | 7/1993  | Filipovich ............ 250/214 VT |

(Continued)

FOREIGN PATENT DOCUMENTS

GB        840843       7/1960

(Continued)

OTHER PUBLICATIONS

Johnson, Alan W., "Understanding how simple magnifiers provide image enlargement," Clinical and Experimental Optometry, No. 86.6, No. 2003, pp. 403-408.

*Primary Examiner*—Thong Nguyen
(74) *Attorney, Agent, or Firm*—Heslin Rothenberg Farley & Mesiti P.C.

(57) ABSTRACT

Optical devices and methods for providing wide field magnification to assist the visually impaired, and others, are provided. The optical device includes a plurality of telescopic lens sets, for example, a plurality of telescopes, each telescopic lens set including an objective lens and an ocular lens, and a plurality of refracting optical elements, for example, prisms, positioned in front of at least some of the objective lenses. The refracting optical elements are adapted to at least partially redirect light rays toward at least some of the objective lenses to provide wider fields of view, for example, a wider contiguous field of view. Aspects of the invention can provide fields of view up to 40 degrees or more. These wider fields of view can greatly enhance the visual acuity of the visually impaired, as well as provide wider fields of view for non-corrective purposes, such as for field observations.

27 Claims, 11 Drawing Sheets

U.S. PATENT DOCUMENTS

| | | | |
|---|---|---|---|
| 5,254,852 A | 10/1993 | Filipovich et al. | 250/214 VT |
| 5,394,272 A | 2/1995 | Kvamme et al. | 359/744 |
| 5,416,315 A | 5/1995 | Filipovich | 250/214 VT |
| 5,446,507 A | 8/1995 | Chang | 351/158 |
| 5,485,306 A * | 1/1996 | Kiunke et al. | 359/419 |
| 5,526,178 A * | 6/1996 | Goldstein et al. | 359/407 |
| 5,680,194 A | 10/1997 | Pasfield | 351/158 |
| 6,018,422 A * | 1/2000 | Feldman | 359/619 |
| 6,075,644 A * | 6/2000 | Filipovich | 359/407 |
| 6,201,641 B1 * | 3/2001 | Filipovich | 359/419 |
| 6,343,767 B1 * | 2/2002 | Sparrold et al. | 244/3.16 |
| 6,462,894 B1 | 10/2002 | Moody | 359/815 |
| 6,469,828 B2 | 10/2002 | Plotsker | 359/409 |
| 6,493,137 B1 | 12/2002 | Solinsky et al. | 359/409 |
| 6,612,693 B2 * | 9/2003 | Kranhouse et al. | 351/43 |
| 6,771,421 B2 * | 8/2004 | Rope et al. | 359/618 |
| 6,775,060 B2 * | 8/2004 | Peli et al. | 359/409 |
| 6,830,331 B2 * | 12/2004 | Jojiki et al. | 351/57 |
| 7,038,863 B2 * | 5/2006 | Chen et al. | 359/725 |

FOREIGN PATENT DOCUMENTS

| | | |
|---|---|---|
| JP | 9 197579 | 7/1997 |
| WO | WO 1989005990 A1 | 6/1989 |

* cited by examiner

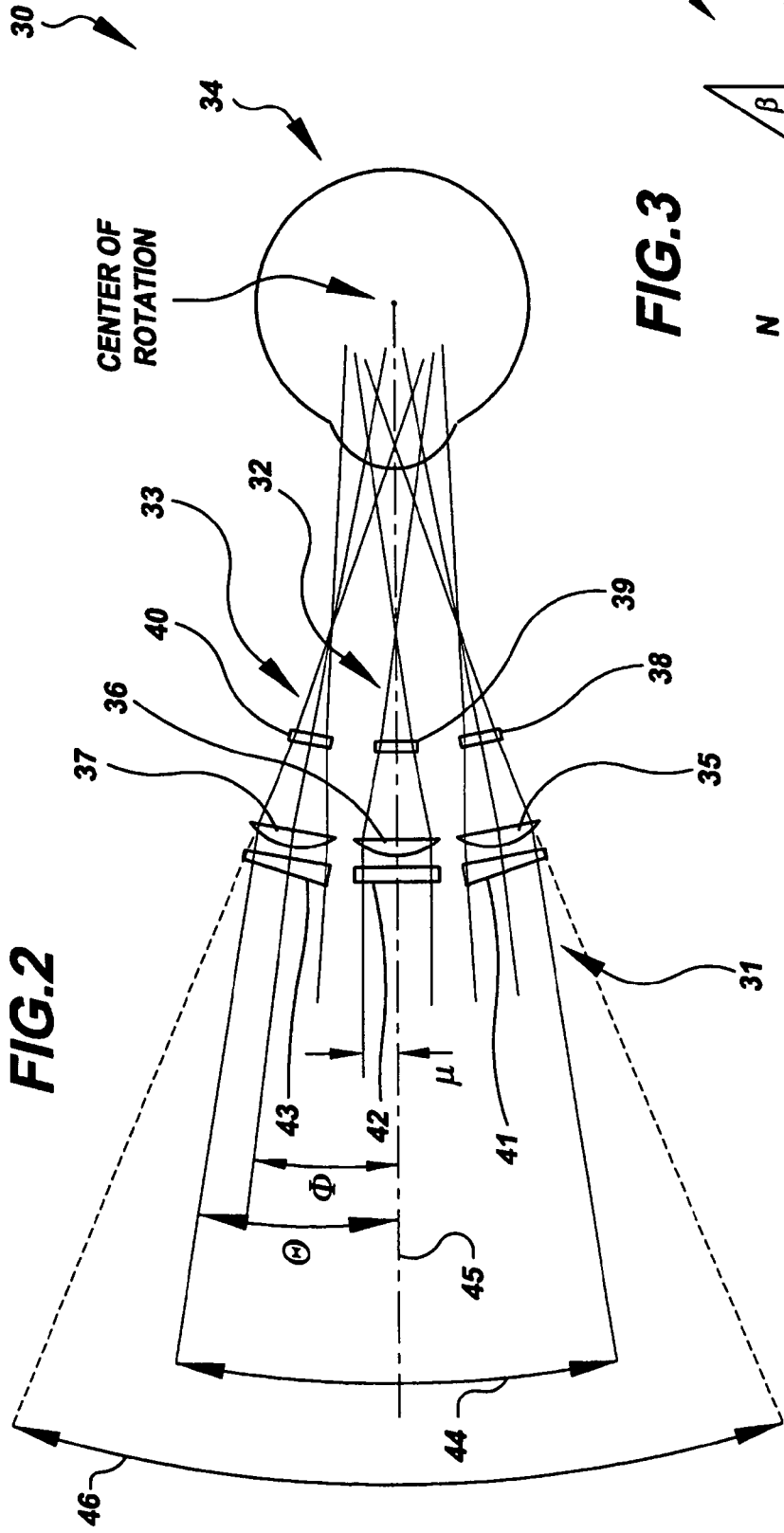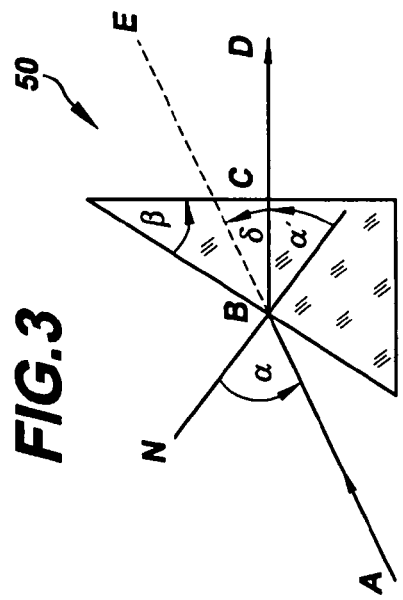

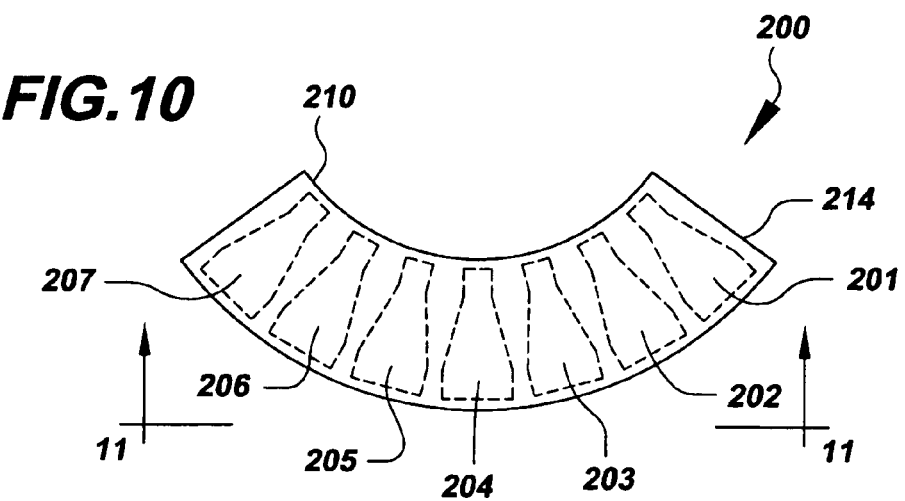
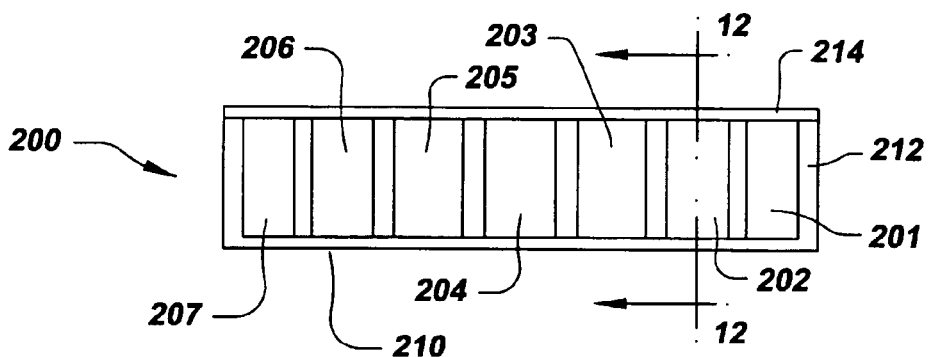
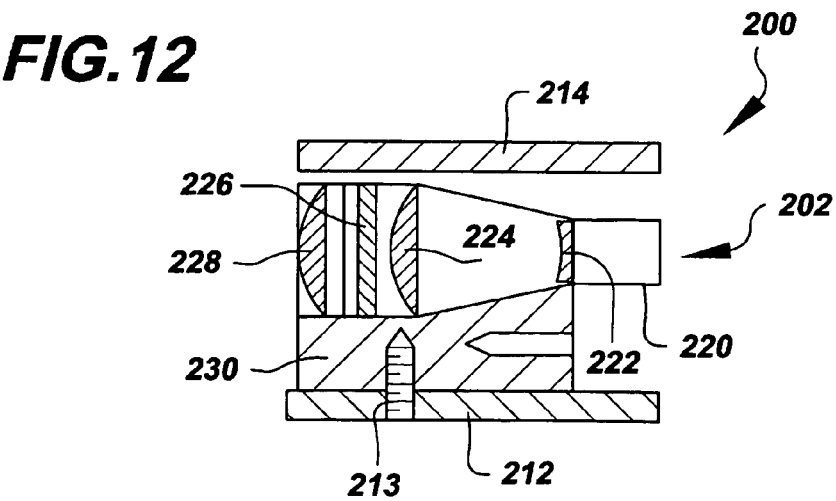

DEVICES AND METHODS FOR PROVIDING WIDE FIELD MAGNIFICATION

TECHNICAL FIELD

The present invention generally relates to optical devices that magnify distant and near objects to assist normally sighted and visually impaired users. More particularly, the present invention relates to optical devices having a plurality of telescopic lens sets that provide an enlarged field of view for distance viewing and near visual tasks, such as, reading.

BACKGROUND INFORMATION

Prior art optical devices include many types of magnifiers, telescopes, and telemicroscopes prescribed to assist the normally sighted and the visually impaired, for example, people with poor vision, to see objects at a distance and close up. Almost all of the existing telescopes designed for the visually impaired are conventional Galilean-type or terrestrial Keplerian-type telescopes. Typically, these conventional telescopes have restricted fields of view that depend mainly on their magnification, degree of optical correction, and the corresponding complexity of their optical design. For example, the field of view (FOV) of a Galilean telescope depends on the diameter of its objective lens. However, increasing the lens diameter of a Galilean telescope exponentially increases the transverse spherical aberration and coma, two common forms of optical aberration. In order to control spherical aberration, coma, and chromatic aberration, conventional telescope designers typically resort to complex objective lenses that, for example, may comprise two or more elements or aspheric surfaces. However, because the angular field of the ocular lens, or eye piece, is equal to the angular field of the objective lens multiplied by the magnification of the telescope, such complex objective lenses often result in an even greater growth in the off-axis aberrations such as coma, astigmatism and field curvature. These aberrations can typically only be corrected by employing a multi-element eyepiece. Thus, as the field is increased, the correction of compound systems such as telescopes and telemicroscopes becomes increasingly complex, and the devices become ever more costly and bulky.

A study of low vision telescopes by Katz, et al. ["Optical Properties of low vision telescopes." 1987, Journal of the American Osteopathic Association, 54(4), 320-31] reported the following fields of view for Galilean telescopes:

| Magnification | Total Apparent Field of View (FOV) |
| --- | --- |
| 2.1 | 21.8 degrees |
| 2.9 | 11.1 degrees |
| 3.7 | 12.1 degrees |

Meade Instruments, a major manufacturer of telescopes, makes 4×30 Galilean binocular that has a 16.5° total apparent field [see http:www.solarobjects/]. Aspects of the present invention provide an apparent field of view greater than that what is presently provided by the prior art. For example, aspects of the invention can provide a 2× Galilean-type telescope having a magnification of 2 and an apparent FOV of greater than 70 degrees, that is, more than triple the FOV of the prior art 2.1× telescopes in the above Table.

With respect to low distance vision impairment, Faye [Clinical Low Vision, 1967, Little Brown and C., Boston, pp. 67, 72, 139, 238] states, "The best practice is for the doctor to prescribe a telescope that will offer the patient the widest field rather than the highest magnification." Increasing the field coverage of telescopes and telemicroscopes offers several advantages. The widened fields improve the ability to search for and acquire objects of interest, for example, a street signs. Seeing the spatial relationships of objects in different parts of the field are improved by widened fields. Aspects of the invention provide these widened fields of view.

Aspects of the present invention also facilitate following moving targets, for example, even following the flight of birds. Other aspects of the invention providing a bioptic array will help the ambulatory user to avoid hazards in the peripheral field. Aspects of the present invention that provide wide peripheral field coverage will be especially useful to patients with central vision loss, hemianopsia, etc.

Bioptic telescopes are used by visually impaired drivers. It has been noted by Owsley, et al. ["Vision impairment and driving," Survey of Ophthalmology, 1999, May-June, 43 (6): 535-550] that visual acuity is only "weakly related to crash involvement, whereas peripheral vision appears to play a more critical role." Aspects of the present invention will offer increased peripheral vision and reduce search time for finding and reading traffic signs, thus, potentially resulting in safer driving.

With respect to near vision impairment, most people with low vision require magnification to read. A magnifying lens's field of view often contains only a few letters at a time. Page navigation is the process by which the reader moves the magnifier from word to word and from the end of one line to the beginning of the next line. As noted by Beckmann, et al. ["Psychophysics of Reading—XIV, The page navigation problem in using magnifiers" Vision Research, 1996 November 36(22) 3723-3733], page navigation takes time and reduces reading speed. Legge, at al. ["Psychophysics of Reading—XVI, The visual span in normal and low vision," Vision Research, 1997 July: 37(14) 1999-2010] note that there is a strong dependence of reading time on word length. Aspects of the present invention can be converted for near vision tasks with lens caps.

Faye [Ibid.] notes that the gain in reading from optical aids is limited by the dimensions of the patient's field at the working distance of the aid. Employing aspects of the present invention, reading and near tasks will become more normal with widened fields. For example, employing aspects of the present invention, entire lines of text may be scanned, and progressing to the next line of text will be improved.

Working distance is an important characteristic of prior art telemicroscopes. As with all telemicroscopes, the working distance will be significantly greater than with a simple magnifier. For example, a 4× telescope with a 2× cap will have a magnification of 8× and a working distance of 125 mm compared with a working distance of 31 mm for an 8× magnifier. Aspects of the present invention can facilitate reading because the lower spatial frequencies of magnified text provided by aspects of the present invention may increase the tolerance to defocus. As noted by Legge, et al. ["Tolerance to visual defocus", Journal of the Optical Society of the American Medical Association, 1987 May: 4(5): 851-863], individuals with low acuity are more tolerant to defocus than people with normal vision.

Thus, a need exists for optical devices that provide an improved field of view that can, among other things, improve distance vision and near vision, for the visually impaired and the non-visually impaired.

SUMMARY OF THE INVENTION

The present invention provides optic devices that provide wide angular fields of view, even extremely wide angular fields of view, for optical systems such as telescopes, telemicroscopes, and magnifiers. Aspects of the present invention comprise an array of telescopes that may provide more than double the field of view of currently available devices. The inventor employed concepts reminiscent of the Cinerama, that is, the wide screen movie projection system. Introduced in 1952, Cinerama comprised a three-lensed camera that photographed the movie action on triple-width 35-mm film. The movie was then screened with three projectors: one in the center and one at each side of the theater. The three film images become one 146-degree wide image with two degrees of overlap on a curved screen, in what could be referred to as a wide screen "mosaic." Aspects of the present invention apply this "mosaic" principle to optic devices, somewhat like the compound eyes of insects, to improve the sight of the visually impaired, and others.

The design of such optics having relatively wide fields of view requires the consideration of and interrelationship between lens diameters and lens powers, angular magnification, eye relief, element field of view (FOV) and vignetting, angular and linear alignment of optics, and lens aperture shape, among other parameters. Through optical analysis, the inventor discovered the interrelationships of the noted parameters to produce an array of telescopes with contiguous FOVs that covered a wide angle. A prototype 2x telescope array was designed using the optical design software OSLO, supplied by Lambda Research Corporation of Littleton, Mass. The 2x array prototype was constructed. The performance of the prototype confirmed the inventor's analytical computations. The inventor has found that contiguous fields according to aspects of the present invention could be produced by an array of telescopes. A prototype 2x telescope array with limited optical correction and adjustability, assembled for preliminary study, confirmed the inventor's analytical computations. Although exact ray tracing demonstrates a seamless contiguity of the composite field of view, several factors, such as vignetting by the field stop, manufacturing tolerances of lenses and mounts, and the precision of alignment of individual telescopes of the array, may result in a deviation from perfect contiguity of fields. However, aspects of the present invention address these considerations and provide an advancement in the art of wide-angle optics.

One aspect of the invention is an optical device including a plurality of telescopic lens sets, each telescopic lens set comprising an objective lens and an ocular lens positioned in telescopic relationship; and a plurality of refracting optical elements, for example, prisms, positioned in front of at least some of the objective lenses, the refracting optical elements adapted to at least partially redirect light rays toward at least some of the objective lenses. The objective lenses of the plurality of telescopic lens sets may be positioned on a common circle of radius $R_c$ or a common sphere of radius $R_s$.

Another aspect of the invention is a method of providing wide field magnification, the method including providing a plurality of objective lenses; positioning a plurality of ocular lens in telescopic relationship with the plurality of objective lenses wherein an image of an object viewed by a user through the objective lenses and ocular lenses is magnified; and refracting light from the object before the light enters the objective lenses wherein a viewer viewing the object through the plurality of ocular lenses views a substantially contiguous wide field view of the object. In one aspect, refracting light from the object comprises positioning a plurality of refracting optical elements, for example, prisms, in front of at least some of the objective lenses. In one aspect of the invention, the prisms, for example, wedges of refracting material, refract and deviate the path of the light from the object.

A further aspect of the invention is a wide field optical magnification system including a plurality of telescopic lens sets, each telescopic lens set comprising an objective lens, an ocular lens positioned in telescopic relationship with the objective lens, and a prism positioned before the objective lens; and a support structure adapted to position the plurality of lens sets; wherein at least some of the prisms comprise a prism angle $\beta$ chosen to refract light toward at least some of the objective lenses to provide a substantially contiguous magnified wide field of view to a user. In one aspect of the invention, the angle $\beta$ may be chosen to refract and deviate light toward at least some of the objective lenses.

These and other aspects, features, and advantages of this invention will become apparent from the following detailed description of the various aspects of the invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

FIG. 2 is a schematic plan view of an arrangement of three telescopic lens sets according to one aspect of the present invention.

FIG. 3 is a schematic diagram of the optical characteristics of a typical prism.

FIG. 10 is a top plan view of an optical device having a plurality of lens set housings mounted therein according to one aspect of the invention.

FIG. 11 is a front elevation view of optical device shown in FIG. 10 as viewed along lines 11-11 shown in FIG. 10.

FIG. 12 is a cross-sectional view of the optical device shown in FIGS. 10 and 11 as viewed along lines 12-12 in FIG. 11.

DETAILED DESCRIPTION OF THE INVENTION

Figure 1:
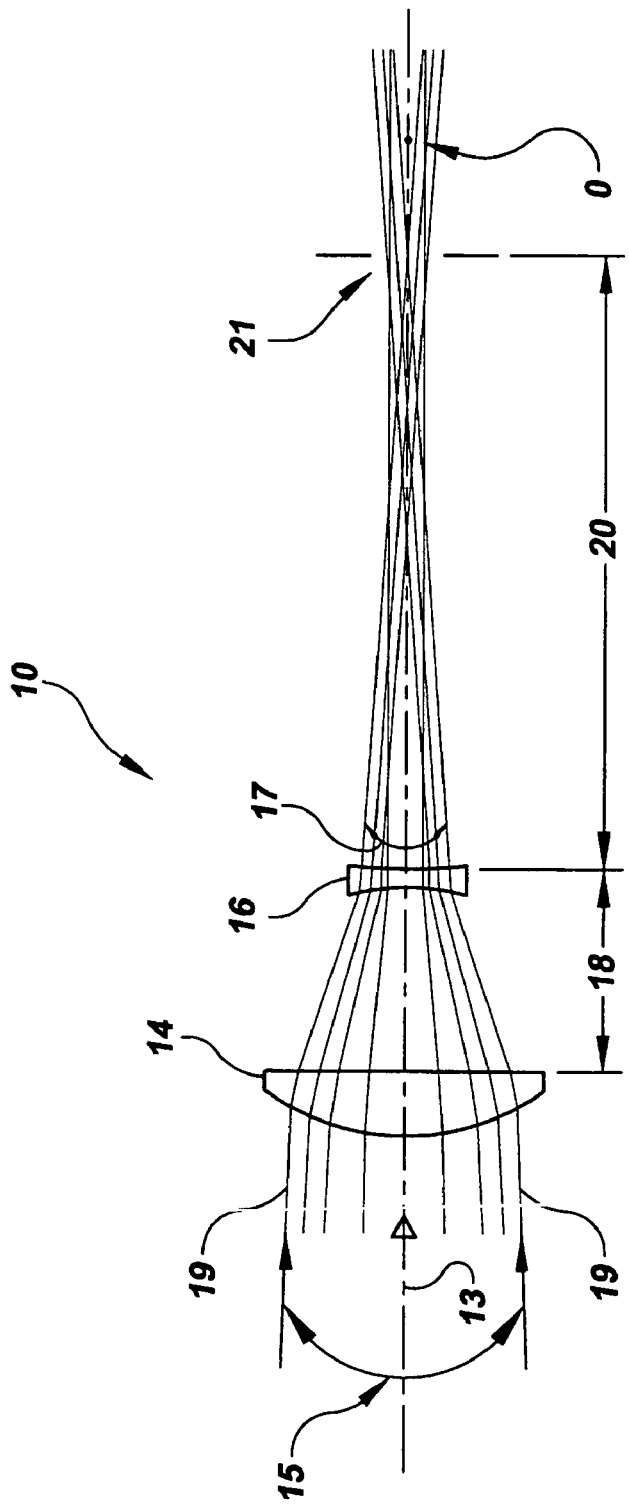
FIG. 1 is a schematic diagram of a typical prior art lens arrangement for a Galilean telescope showing light rays entering the iris, that is, the aperture stop, of a human eye.

FIG. 1 is a schematic diagram of a typical prior art lens set 10 coupled to a human eye (not shown) having an iris, that is, an aperture stop, 21. Lens set 10 may be typical of a lens arrangement that may be used for telescopes and telemicroscopes and may be referred to herein as a "telescopic lens set." As is typical, lens set 10 includes an objective lens 14 and an ocular, or eye, lens 16. As is known in the art, objective lens 14 collects light, as indicated by an axial collimated pencil of light rays 13, from a distant object (not shown), and converges that light to a point or focus at the second focal plane lens (not shown) of the objective. The objective lens 14 also collects collimated pencils of light from both edges of the FOV 17. Light pencils 19 are each focused as points in the second focal plane of objective lens 14. Ocular lens 16 intercepts the converging pencils of light before they reach the focal plane of objective 14 and recollimates the pencils with magnified angles and directs these pencils of light to the entrance pupil of the eye. Light pencils 19 represent field angles having 50% vignetting (that is, these light rays fill half of the diameter of the aperture stop 21). The outermost rays of the pencils 19 are the chief rays. Field of view is typically specified by the ray pencils that are 50% vignetted. The magnified angles produced by the ocular lens 16 enlarge the image formed on the retina of the eye (not shown). Objective lens 14 and ocular lens 16 are positioned in "telescopic relationship," that is, objective lens 14 and ocular lens 16 are sized and positioned whereby an object appears magnified in size when viewed through ocular lens 16 and objective lens 14.

In the following discussion and in the appending claims, one or more lenses and associated optics that are in telescopic relationship as lens set 10 may be referred to as "a telescopic lens set." Telescopic lens set 10 may comprise a Galilean-type lens set, where objective lens 14 is a convex lens and ocular lens 16 is a concave lens, or a Keplerian-type lens set, where objective lens 14 and ocular lens 16 may both be convex lenses. In the Keplerian-type arrangement, the image seen by the user is upside-down (inverted). Keplerian telescope designs may be modified to erect the image by variously inserting relay lenses, prisms and/or mirrors between the objective and ocular lenses. So modified, Keplerian telescopes may be used as terrestrial telescopes. Typically, the observer's eye is relatively fixed in position behind the telescope in viewing its magnified image.

In FIG. 1, a Galilean lens set was chosen for lens set 10 for simplicity and since it provides erect images. The field of view of lens set 10 is defined by arcs 15 and 17, where arc 15 represents the real field of view at 50 % vignetting, and arc 17 represents the apparent field of view at 50% vignetting ("vignetting" is a term of the art that is discussed below). The light rays defining the range of the real field of view defined by arc 15 are the 50% vignetted light rays 19 in FIG. 1.

According to aspects of the present invention, an array of telescopes, or telescopic lens sets, is provided which provide the viewer with a wide field of view, for example, a wide contiguous field of view, as shown in FIG. 2. With reference to FIG. 2, the observer's eye 34 is mobile; it rotates about its center of rotation to view a wide contiguous field of view through the array of telescopes. According to aspects of the present invention, the design of an array of telescopes requires the consideration, analysis, and specification of several optical and mechanical parameters. Among the optical and mechanical design parameters that are considered are: lens diameters and powers, eye pupil size, angular magnification, eye relief, telescope field of view (FOV) based on appropriate vignetting, angular and geometric alignments of telescopes, lens aperture shape, and the specification of prisms to obtain contiguity of magnified field elements, among others. These and other parameters will be defined and discussed below.

As is known in the art, the field of view of Galilean telescopes is dependent upon the size of the objective lens, which cannot be arbitrarily set in the array design. Through analysis, the inventor has shown that the widths of the objective lenses seen in the front view are affected, and in some instances fixed, by the need to provide physical clearance of adjacent lenses and the desire to provide contiguous horizontal fields of view. The vertical field of view of individual telescopes may be larger than the horizontal field, but the vertical field of view may be limited by the need to avoid too complex an objective lens design to correct the concomitant increase in aberrations.

As is known in the art, the magnification (M) of lens set 10 is typically given by Equation 1:

$$M = f_o/-f_e \qquad \text{Equation 1,}$$

where $f_o$ is the positive focal length of objective lens 14 and $f_e$ is the negative focal length of ocular lens 16. As is also known in the art, the distance between objective lens 14 and ocular lens 16, that is, the "lens separation," d, is given by Equation 2:

$$d = f_o + f_e \qquad \text{Equation 2,}$$

The lens separation is identified by 18 in FIG. 1. The relative aperture opening, F/# or f-stop, chosen for objective lens 14 determines the diameter of objective lens, $D_o$, 14 and is governed by Equation 3:

$$F/\# = f_o/D_o \qquad \text{Equations 3.}$$

Objective lens 14 and ocular lens 16 are separated by a distance 18 and ocular lens 16 and eye are separated by a distance 20, that is, the "eye relief," e. The diameter of the ocular (or eye) lens 16 is represented by $D_e$. The eye position is basically fixed when looking through a single telescope. To view different directions, the telescope and head of the viewer must turn. To view the wide FOV presented by aspects of the present invention, the mobile eye must rotate in its socket about its center of rotation O, as it normally does in everyday seeing. The diameter of the hypothetical aperture stop at the center of rotation O is represented by $D_a$. In the art of the present invention, the desirable distance from the ocular lenses to the center of rotation O, that is, the eye relief, e, is generally 27 mm. According to aspects of the present invention, the arrays of one or more telescopic lens sets may be arranged so that the optical axes of all lens sets intersect at the center of rotation of the eye, O. According to one aspect of the invention, a hypothetical aperture stop 21, $D_a$, is located at the center of rotation, O.

In one aspect of the present invention, the optical effect referred to as "vignetting" is significant. According to one photonics dictionary, vignetting is the gradual reduction of image illuminance as the off-axis angle increases, resulting from limitations of the clear apertures of elements within an optical system. For example, in old-fashioned portrait photography, the corners of a picture may be darkened (for artistic effect); this is an example of vignetting. The standard definition of field of view (FOV) is the angle at which vignetting is 50%. According to some aspects of the invention, 50% vignetting is not the optimum amount of vignetting for optimal contiguity. According to one aspect of the invention, it is desirable to provide substantially contiguous fields of view among telescopic lens sets without overlap or gaps. In one aspect of the invention, these substantially contiguous fields of view among telescopic lens sets may be provided by employing specific amounts of vignetting. In order to investigate the effect of vignetting on the contiguity of the fields of view of the optical arrangements according to aspects of the present invention, the inventor developed Equation 4.

$$\tan u = \frac{(D_0/(2M)) + (V - 0.5)/Da}{(eM) + d} \qquad \text{Equation 4}$$

In Equation 4, u is one-half the FOV of the optic, in degrees; $D_o$ is the diameter (or width) of the objective lens, a length, for example, millimeters; M is the magnification of the lens set, a ratio; $D_a$ is the diameter of the hypothetical aperture stop at the center of rotation, a length, for example, millimeters; e is the eye relief, a length, for example, millimeters; d is the lens separation, a length, for example, millimeters; and V is the vignetting percent or ratio expressed as a decimal.

In addition, the inventor developed Equation 5 to determine the diameter of the ocular lens, $D_e$, as a function of vignetting V. The variables in Equation 5 are the same $$D_e = 2\frac{[eD_0/2 - (V - 0.5)dD_a]}{(eM) + d} \qquad \text{Equation 5}$$

as those defined for Equation 4.

An example calculation will illustrate the use of Equations 4 and 5. Assuming that lens set 10 has a power of 2×, that is, M=2; an f-stop of F/2.5 for objective lens 14; a focal length, $f_o$, of 16 mm; an objective lens 14 diameter (or width), $D_o$, of 6.4 mm; an ocular lens 16 focal length, $f_e$, of −8 mm; a separation between objective lens 14 and ocular lens 16, d, of 8 mm; an aperture stop diameter, $D_a$, of 3 mm; an eye relief, e, of 27 mm; and 100% vignetting (that is, V=1.0), Equations 4 and 5 are evaluated in Equations 6 and 7, yielding the tan of the half field of view, u, and the diameter (or width) of the ocular lens, $D_e$:

$$\tan u = \frac{(6.4 \text{ mm}/(2 \times 2)) + (1.0 - 0.5)3 \text{ mm}}{(27 \text{ mm} \times 2) + 8 \text{ mm}} = 0.050 \qquad \text{Equation 6}$$

$$D_e = 2\frac{[27 \text{ mm} \times 6.4 \text{ mm}/2 - (1.0 - 0.5)8 \text{ mm} \times 3 \text{ mm}]}{(27 \text{ mm} \times 2) + 8 \text{ mm}} = 2.40 \text{ mm} \qquad \text{Equation 7}$$

Therefore, for 100% vignetting, the object space half-field of view, u, of optic arrangement 10 is evaluated in Equation 8 as:

$$u_{100\%} = \arctan(\tan u) = \arctan 0.050 = 2.8624 \text{ degrees} = 2.86 \text{ degrees} \qquad \text{Equation 8}$$

and the image space or apparent half field of view, u', is given by Equation 9 as $$u' = Mu = 2(2.86 \text{ degrees}) = 5.72 \text{ degrees} \qquad \text{Equation 9}$$

According to one aspect of the invention, a rectangular lens shape will maximize contiguity of an azimuthal array of adjoining telescopic lens sets 10. The objective lenses of adjacent lens sets may have straight and parallel sides. In the previous example, an array of three lens sets 10 would provide a total real field of view in the azimuthal (or circumferential) direction of 3×2×2.86 degrees=17.16 degrees; an array of seven lens arrangements 10 would provide a total real field of view in azimuth of 7×2×2.86 degrees=40.0 degrees. Accordingly, the image space, u', or apparent field of view, is twice as large, that is, about 34.32 degrees and about 80.1 degrees, respectively. According to other aspects of the invention, other numbers of lens sets will provide corresponding total real and apparent fields of view.

According to one aspect of the invention, by making the objective lenses 14 rectangular in shape, with a longer vertical dimension, rather than square or circular, each lens arrangement 10 may cover a larger field in elevation. (The field of view of a Galilean telescope depends on the size of the objective lens.) Thus, a lens set 10 having a rectangular objective lens 14, that is, for example, 6.4 mm wide ($D_o$) and 9.6 mm in height (that is, having an aspect ratio of 1.5) would cover about 5.72 degrees in the azimuthal (or circumferential) direction and about 1.5×5.72=8.6 degrees in elevation. Such an array of three lens arrangements 10 could provide a real field of view of about 17.16 degrees×8.6 degrees; an array of seven lens sets 10 could provide a real field of view of about 40 degrees×8.6 degrees. With a magnification of 2×(M=2), the apparent field of view will be twice as large.

Though in the above example, 100% vignetting was assumed, that is, V=1.0, according to one aspect of the invention, vignetting may be varied. For example in one aspect, vignetting may vary from 50% to 100%, or be selected at any value in between 50% and 100%. In one aspect of the invention, vignetting may be constant for all lens sets in an array. In another aspect, the vignetting may vary from one lens set to another, or from one row or section of lens sets to another row or section of lens sets in an array of lens sets.

FIG. 2 is a schematic plan view of an arrangement or array 30 of three telescopic lens sets 31, 32, and 33 coupled to a human eye 34 according to one aspect of the invention. In FIG. 2, and in other figures illustrating aspects of the invention, the relative size and positions of lens sets 31, 32, and 33 and the relative size and position of human eye 34 are not necessarily drawn to scale, but are drawn to best illustrate aspects of the invention. In one aspect of the invention, lens sets 31, 32, and 33 comprise telescopes, for example, Galilean telescopes. As shown in FIG. 2, the object space axial rays 51, 52 and 53 continue into and coincide with telescopic lens sets 31, 32, and 33, respectively, and substantially intersect at the center of rotation of the eye, O. Similar to telescopic lens set 10 shown in FIG. 1, telescopic lens sets 31, 32, and 33 include objective lens 35, 36, and 37, respectively, and ocular lenses 38, 39, and 40, respectively. The total real and apparent fields of view of arrangement 30 are indicated by arcs 44 and 46, respectively, in FIG. 2. As shown in FIG. 2, the edge rays associated with each lens set 31, 32, and 33 are designated with the letters "a" and "b." For example, for lens set 31 receiving axial ray 51, the lower edge ray entering lens set 31 is designated 51a and the upper edge ray is designated 51b. Similar designations are also shown for the other lens sets 32 and 33 in FIG. 2.

Simply pointing each telescope in the array at adjacent real fields in the object space would result in severely overlapped apparent fields due to the angular magnification of lens sets 31, 32, and 33. On the other hand, if lens sets 31, 32, and 33 are aimed so that the magnified image space fields do not overlap, true contiguity will not result because the lens sets will have viewed noncontiguous portions of the object fields. In other words, portions of the real field may be missing. According to one aspect of the invention, to substantially obtain contiguity, the actual inner and outer edges of the edge-of-the-field ray angles of adjacent lens sets are preferably substantially identical and the objective lens preferably do not overlap. According to one aspect of the invention, in order to provide contiguity, at least one optical element 41, 42, and 43, for example, a prism, may be positioned in front of each lens set 31, 32, and 33. Optical element 41, 42, and 43 may be a refracting optical element, that is, any element that refracts light rays wherein the light rays are at least partially redirected, for example, toward their respective objective lens. In one aspect of the invention, optical elements 41, 42, and 43 refract or bend the incoming light to deviate adjacent real object space fields so that their corresponding magnified fields in image space are seen by the viewer to be adjacent to each other. Optical elements 41, 42, and 43 may comprise prisms, for example, plastic or glass prisms, diffractive optical elements, or mirrors, among others. Though optic elements 41, 42, and 43 may be any refracting optical element, in the following discussion and in the accompanying claims, optical elements 41, 42, and 43 will be referred to as prisms 41, 42, and 43. Though optical element 42 may be referred to as a "prism," in some aspects of the invention, the optical element positioned along the centerline 45, for example, optical element 42 in FIG. 2, may refract little or no incoming light, that is, optical element 42 may not be a prism. Since the light passing through objective lens 36 is transmitted from the object directly into objective lens 36, no optical deviation of this light may be necessary. In one aspect of the invention, the optical element positioned along the centerline 45 may nondeviating, for example, a window, or may be omitted.

According to one aspect of the present invention, the lens sets 31, 32, and 33 are preferably pointed to magnify contiguous real FOVs into contiguous apparent FOVs. As discussed above, the half FOV in object space for each lens set is the value u. According to aspects of the present invention, prisms 41, 42 and 43 are preferably provided, for example, with a power P to deviate incoming light rays to provide a contiguous apparent FOV with the required magnification. According to one aspect of the invention, the object space axial rays 51, 52 and 53 striking prisms 41, 42 and 43 are separated by an angle equal to the FOV=2 u. After deviation by prisms 41, 42, and 43, the axial rays are separated by an angle of M×2 u. In this example M=2. For example, assuming the half FOV u, in object space for each lens set 31, 32 and 33 is 2.86 degrees, the axial rays 51, 52 and 53 striking prisms 41, 42 and 43 are separated by an angle equal to the FOV=2×u=5.72 degrees. After deviation by the prisms the axial rays are separated by an angle of M×2×u=11.44 degrees.

For example, with reference to FIG. 2, assuming a half FOV u, at the selected vignetting (for example, 100% in this example), of 2.86 degrees in object space for each lens set 31, 32 and 3, then the total real FOV is 2×u=is 5.72 degrees. The total field of view is delimited by the two edge rays for each lens set 31, 32 and 33. For instance, to provide contiguity between FOVs, the two object space edge rays for lens set 32 make angles of −2.86 degrees and +2.86 degrees with reference to the centerline 45; the two object space edge rays of lens set 33 make angles of +2.86 degrees and +8.58 degrees (that is, 2.86+5.72); and the two object space edges of lens set 31 make angles of −2.86 degrees and −8.58 degrees. Correspondingly, the axial rays 51, 52 and 53 in object space of each lens set 31, 32, and 33, to provide contiguity, are preferably, −5.72 degrees, 0 degrees, and +5.72 degrees, respectively. According to aspects of the present invention, these angular values in image space will be magnified by magnification M to provide the apparent angular values for each lens set. For example, for magnification of M=2, the apparent FOV=M×FOV for each lens set 31, 32, and 33 will be 2×5.72 degrees=11.44 degrees and the apparent half apparent FOV=of lens set 32 will range from +5.72 degrees to +17.16 degrees (that is, M×u+M×FOV=+17.16 degrees). Thus, the axis of lens set 33 will be directed at +11.44 degrees, midway between +5.72 and +17.16 degrees (that is, [5.72+17.16]/2). In FIG. 2 and others, the edge rays for each lens set are shown individually for the sake of clarity. However, according to aspects of the present invention, the edge rays of the FOVs of adjacent lens sets are preferably substantially collinear and parallel, thus providing a substantially contiguous FOV to the viewer. For this example, the total real FOV for the array 30 shown in FIG. 2 is about +/−8.58 degrees (that is, 17.16 degrees.); the total apparent FOV is about +/−17.17 degrees (that is, 34.34 degrees).

In one aspect of the invention where optical elements 41, 42, and 43 comprise prisms, optical elements 41, 42, and 43 may be designed to refract or deviate light rays from the center of the object field so that the light rays emerge perpendicular to the rear surface of each prism. In one aspect of the invention, this perpendicular direction may be coincident with the alignment angle (or telescope pointing angle), $\phi$, of each lens set (or telescope) 31, 32, and 33. According to this aspect of the invention, the alignment angle of a lens set is the angle the centerline of the lens set makes with the centerline 45 of the array of lens sets, for example, angle $\phi$ in FIG. 2 is the alignment angle of lens set 33. As discussed above, in one aspect, where each of the FOVs of each adjacent lens set is contiguous with its adjacent lens sets, the angle in object space of center ray 53 that will coincide with the axis of lens set 33 and thus establish its alignment angle, is a function of half FOV, u. For example, in one aspect, the object space angle of ray 53 of lens set 33 may be $\theta=2\times u$, for example, 5.72 degrees. The alignment angle of lens set 33 thus may be $\phi=M\times 2\times u$., for example, 11.44 degrees.

In another aspect of the invention, where each of the FOVs of each adjacent lens set is contiguous with its adjacent lens sets, the angle of orientation of the axial rays of a lens set, $\phi$, may also be a function of u. For example, in one aspect, the angle of the axial ray of the lens set 33 is $\theta=2\times u$. Assuming that u=2.86 degrees, the alignment angle $\phi$ and the angle of the object space axial ray line $\theta$ for each lens set 31, 32, and 33, according to one aspect of the invention, are summarized in Table 1, where nominal values correspond to the axial rays.

Table 1 also provides the slopes in object space of the edge rays 51a, 51b, 52a, 52b, 53a and 53b for each of the lens sets 31, 32, and 33, respectively. The slopes of these rays after deviation by the prisms are increased by the lens set magnification. According to one aspect of the invention, the slopes of edge rays 51b and 52a of lens sets 41 and 42 are substantially equal, as are the edges rays 52b and 53a of lens sets 42 and 43, thus providing contiguity. In one aspect, because the edge and axial rays are each deviated to different degrees by prisms 31 and 33, errors in contiguity may occur. These errors may be minimized or eliminated by adjusting the ray set axis angles and prism angles, for example, by iteratively evaluating Equation 10 to trace the slopes of the edge rays through the prisms until the slopes of adjacent lens set edge rays (for example, rays 51b and 52a, and 52b and 53a) are substantially equal. In one aspect, this procedure results in the corrected values for prism deviation and prism angle provided in Table 1. Other values of θ and φ will be provided as the value of u varies, for example, as one or more of the parameters in Equation 4 vary.

TABLE 1

Angles Associated with Lens Sets of FIG. 2
(u = 2.86 degrees)

| | Lens set (or telescope) | | |
|---|---|---|---|
| | 31 | 32 | 33 |
| Object field angle of ray sets, θ degrees | −5.72 | 0 | 5.72 |
| Ray set alignment angle, φ, degrees | −11.44 | 0 | 11.44 |
| Slope of ray 53b in object space, degrees | | | 8.59 |
| Slope of ray 53a in object space, degrees | | | 2.86 |
| Slope of ray 52b in object space, degrees | | 2.86 | |
| Slope of ray 52a in object space, degrees | | −2.86 | |
| Slope of ray 51b in object space, degrees | −2.86 | | |
| Slope of ray 51a in object space, degrees | −8.59 | | |
| Nominal Prism deviation, δ, degrees | −5.72 | 0 | 2u = 5.72 |
| Nominal Prism angle, β, degrees | −10.819 | 0 | 10.819 |
| Corrected Prism deviation, δ, degrees | −5.616 | 0 | 5.616 |
| Corrected Prism angle, β, degrees | −10.622 | 0 | 10.622 |

In one aspect of the invention, in order for prisms 41, 42, and 43 to deviate the path of the incoming light whereby the light emerges from prisms 41, 42, and 43 in a direction substantially coincident with the alignment angle, φ, the prism deviation angle, δ, that is, the angle through which the incident light is bent by a prism, may be the difference between alignment angle, φ, and the object space axial ray angle, θ. That is, in one aspect of the invention, δ=φ−θ. The prism deviation angle, δ, for lens sets 31, 32, and 33 also appears in Table 1.

The refraction of light through a prism is governed by Snell's law for refraction that is expressed in Equation 10.

$$\sin \alpha = n \sin \alpha' \quad \text{Equation 10}$$

where α and α' are the incident and refracted angles, respectfully, and n is the index of refraction of the prism. A typical prism 50 and the related geometry and light paths are illustrated in FIG. 3. Prism 50 is characterized by a prism angle β and a prism deviation angle, δ. As shown in FIG. 3, A is an incoming light beam, B is the point of contact of light beam A with the surface of prism 50, C is the point of emergence of the refracted light beam D, and E is the path light beam A would take if not refracted by prism 50. N is the normal to the incident surface of prism 50 at the point of contact B. Angle α is the angle between the direction of the incoming light beam A and normal N. Angle α' is the angle between the direction of the refracted light beam D and normal N. In one aspect of the invention, light beam D may emerge perpendicular to the surface of prism 50 at point C. Under these conductions, for prism 50, the prism angle β substantially equals the prism deviation angle δ, that is, β=δ. It is recognized in the art, that under these conditions, the relationship recited in Equation 11 applies and can be used to determine the desired refraction angle for a prism.

$$\tan \beta = \frac{\sin \delta}{n - \cos \delta} \quad \text{Equation 11}$$

The variables in Equation 11 were defined above. For example, in one aspect, prism 43 of lens set 33 deviates light rays through an angle δ=2×u=5.725 degrees (see Table 1). For a prism having an index of refraction n=1.517 (for example, for a borosilicate crown glass prism), Equation 11 yields $$\tan \beta = \frac{\sin 5.725}{1.517 - \cos 5.725} = 0.1911 \quad \text{Equation 12}$$

which yields β=10.819 degrees.

Therefore, for prism 43 of lens set 33 to deviates light rays whereby a substantially contiguous field of view is provided to the observer, angle β of prism 43 may have a value of about 10.819 degrees. The corresponding prism angles β for prisms 41, 42, and 43 are also listed in Table 1. The angles presented in Table 1 are nominal angles. Because the edge and axial rays may each be deviated to different degrees by the prisms 41 and 43, errors in contiguity may occur. In one aspect, these errors may be minimized or eliminated by iteratively evaluating Equation 10 to trace edge rays through the prisms until adjacent edge rays of adjoining ray sets are substantially equal and, thereby, correct the deviation angles and prism angles. Additional modifications may be made as a result of trigonometric ray tracing used to design the ray sets. Errors in contiguity, for example, due to manufacturing tolerances, can be corrected by adjusting the values of angle β and/or adjusting the orientation of the lens sets. This may require one or more iterations.

According to aspects of the present invention, the vignetting (V) of the optical device may be optimized to provide optimal contiguity between fields of view. Typically, in conventional optical devices, 50% vignetting is used to define the field of view (FOV); however, 50% vignetting may result in undesirable overlapping of FOVs by the lens sets of one aspect of this invention. In one aspect of the invention, a maximum of 100% vignetting is provided. Though 100% vignetting may preclude overlap of FOVs by adjacent lens sets, a falloff of illumination at the edges of the FOVs may be perceived as a gap in the FOV. Manufacturing tolerances may, for example, also result in gaps between FOVs of adjacent lens sets. To prevent these gaps, in one aspect of the invention, the vignetting may be greater than about 50% and less than about 100%. For example, in one aspect of the invention, a slight overlap in the FOVs may be preferred. In one aspect, the vignetting may be between about 85% and about 95%, for instance, about 90%.

According to one aspect of the invention, at least 2 telescopic lens sets may be used to provide the benefits of the present invention. In other aspects of the invention, at least three lens sets may be used as shown in FIG. 2. In other aspects of the invention, the number of lens sets is only limited by acceptable size of the optical system, by the physical restrictions of the user, for example, having one or two eyes, having a limited field of view, for example, less than 180 degrees. For example, in some aspects of the invention, 4, 5, 6, 7, or 8 or more lens sets may be used. However, aspects of the invention may not be limited for use by humans, but may be coupled to any light-detecting device, for example, close-coupled devices (CCD), to detect light. In this aspect of the invention, lens sets may be arranged in arrays spanning at least 180 degrees or more, for example, even 360 degrees, in the azimuthal (or circumferential) direction. In other aspects of the invention, to increase the elevation FOV, lens set arrays may be positioned in rows above and below the horizontal azimuthal plane, for example, the elevation FOV of the horizontal azimuthal ray set may be about +u and about −u degrees, or multiples thereof. For example, in one aspect, the elevation FOV of the rows of lens sets above the azimuthal plane may range from about +u to about +3u degrees, or more, and the elevation FOV of the rows of lens sets below the azimuthal plane may range from about −u to about −3u degrees, or more. In one aspect of the invention, the total elevation FOV equals about 6 u degrees. In one aspect, the lens sets may be arranged in multiple altitudes or rows, each altitude or row spanning an azimuthal field angle. In one aspect of the invention, lens sets may be arranged in a spherical configuration having azimuths ranging from 0 degrees to 360 degrees and altitudes scanning from 0 degrees to 360 degrees, or any azimuth or altitude angle in between these extremes.

Figure 4:
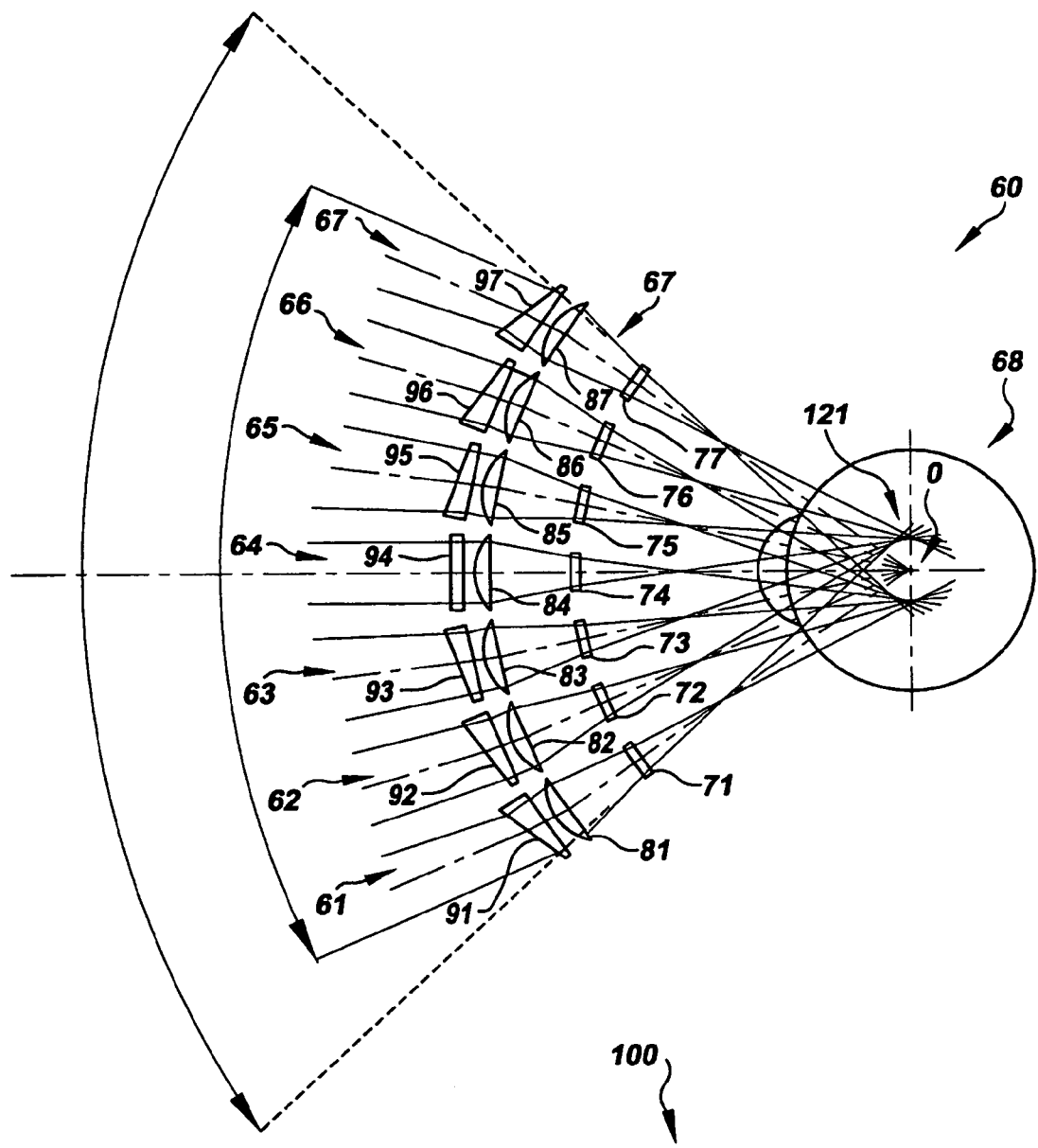
FIG. 4 is a schematic plan view of an arrangement of seven telescopic lens sets according to one aspect of the present invention.

FIG. 4 is a schematic plan view of an arrangement 60 of seven telescopic lens sets 61, 62, 63, 64, 65, 66, and 67 according to one aspect of the present invention. Lens sets 61 through 67 direct light a hypothetical aperture stop 21 of a representative human eye 68 having center of rotation O. Similar to lens sets 41, 42, and 43, each lens set 61, 62, 63, 64, 65, 66, and 67 includes an ocular lens 71, 72, 73, 74, 75, 76, and 77; an objective lens 81, 82, 83, 84, 85, 86, and 87; and a prism 91, 92, 93, 94, 95, 96, and 97, respectively. In a manner similar to that used in FIG. 2, in FIG. 4, axial rays and edge rays associated with each lens sets 61 through 67 are designated with the letters "a," "b," and "c," where the axial ray associated with a lens set is designated with a"c," the lower edge ray is designated with an "a," and the upper edge ray is designated with a "b." For example, lens set 61 receives an axial ray 61c, a lower edge ray 61a, and an upper edge ray 61b. Similar designations are also shown for the lens sets 62 and 67, but are omitted from lens sets 63 through 66 for the sake of clarity.

Similar to prism 42 discussed with respect to FIG. 2, prism 94 may be a non-deviating window. Again, in one aspect of the invention, prism 94 may be omitted without affecting the performance of the invention. The corresponding lens set parameters for telescopic lens sets 61 through 67 according to one aspect of the invention are summarized in Table 2; again, a half FOV angle of 2.86 degrees is assumed. The real FOV for the array 60 shown in FIG. 4 is about 40.04 degrees (that is, 7×5.72); the apparent FOV is about 80.08 degrees (that is, 7×2×5.72), assuming a half FOV, u, of 2.86 degrees. Because the edge and axial rays may each be deviated to different degrees by any one of the prisms 91, 92, 93, 94, 95 96 and 97, errors in contiguity may occur. In one aspect of the invention, these errors may be minimized or eliminated by adjusting the axis angles and/or the prism angles.

TABLE 2

Angles Associated with Lens Sets of FIG. 4
(u = 2.86 degrees)

| | Lens set (or telescope) | | | | | | |
|---|---|---|---|---|---|---|---|
| | 61 | 62 | 63 | 64 | 65 | 66 | 67 |
| Object field angle of ray sets, θ degrees | −17.17 | −11.45 | −5.725 | 0 | 5.725 | 11.45 | 17.17 |
| Ray set alignment angle, φ, degrees | −34.35 | −22.90 | −11.450 | 0 | 11.450 | 22.90 | 34.35 |
| Nominal Prism deviation, δ, degrees | −17.17 | −11.45 | −5.725 | 0 | 5.725 | 11.45 | 17.17 |
| Nominal Prism angle, β, degrees | −27.74 | −20.29 | −10.819 | 0 | 10.819 | 20.29 | 27.74 |
| Corrected Prism deviation, δ, degrees | −15.124 | −10.758 | −5.616 | 0 | 5.616 | 10.758 | 15.124 |
| Corrected Prism angle, β, degrees | −25.313 | −19.247 | −10.622 | 0 | 10.622 | 19.247 | 25.313 |

In one aspect, the flanking, or off-centerline, telescopic lens sets may provide the wider peripheral fields which are used to acquire objects of interest that are then viewed through the center lens set 64 by turning the head toward the objects acquired by the off-center lens sets. The extreme object space edge rays 61a and 67b in FIG. 4 are oriented at about +20.04 degrees and about −20.04 degrees to the centerline. Edge rays 61a and 67b delimit the real FOV 69 of the array of lens sets. The apparent FOV 70 in FIG. 4 is delimited by the projection of rays 61a and 67b in image space (after magnification by the respective lens sets). For a magnification, M, of 2, the corresponding angles of FOV 70 are about +40.07 degrees and about −40.07 degree, respectively.

Figure 5:
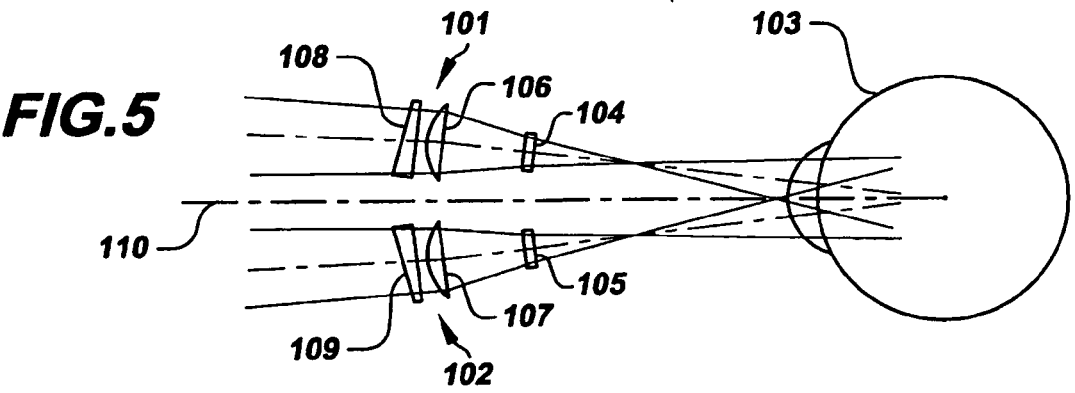
FIG. 5 is a schematic plan view of an arrangement of two telescopic lens sets according to one aspect of the present invention.

In one aspect of the invention, telescopic lens sets may straddle a centerline. FIG. 5 is a schematic plan view of an arrangement 100 of two telescopic lens sets 101 and 102 according to another aspect of the present invention. In this aspect of the invention, lens sets 101 and 102 straddle the centerline 110 of arrangement 100 and direct light to representative human eye 103. Lens sets 101 and 102 include ocular lenses 104 and 105, objective lenses 106 and 107, and prisms 108 and 109, respectively. Though not shown in FIG. 5, additional lens sets may be introduced to arrangement 100 to broaden the field of view of arrangement 100, for example, arrangement 100 may include at least 3 lens sets, 4 lens sets, or 8 or more lens sets.

Figure 6:
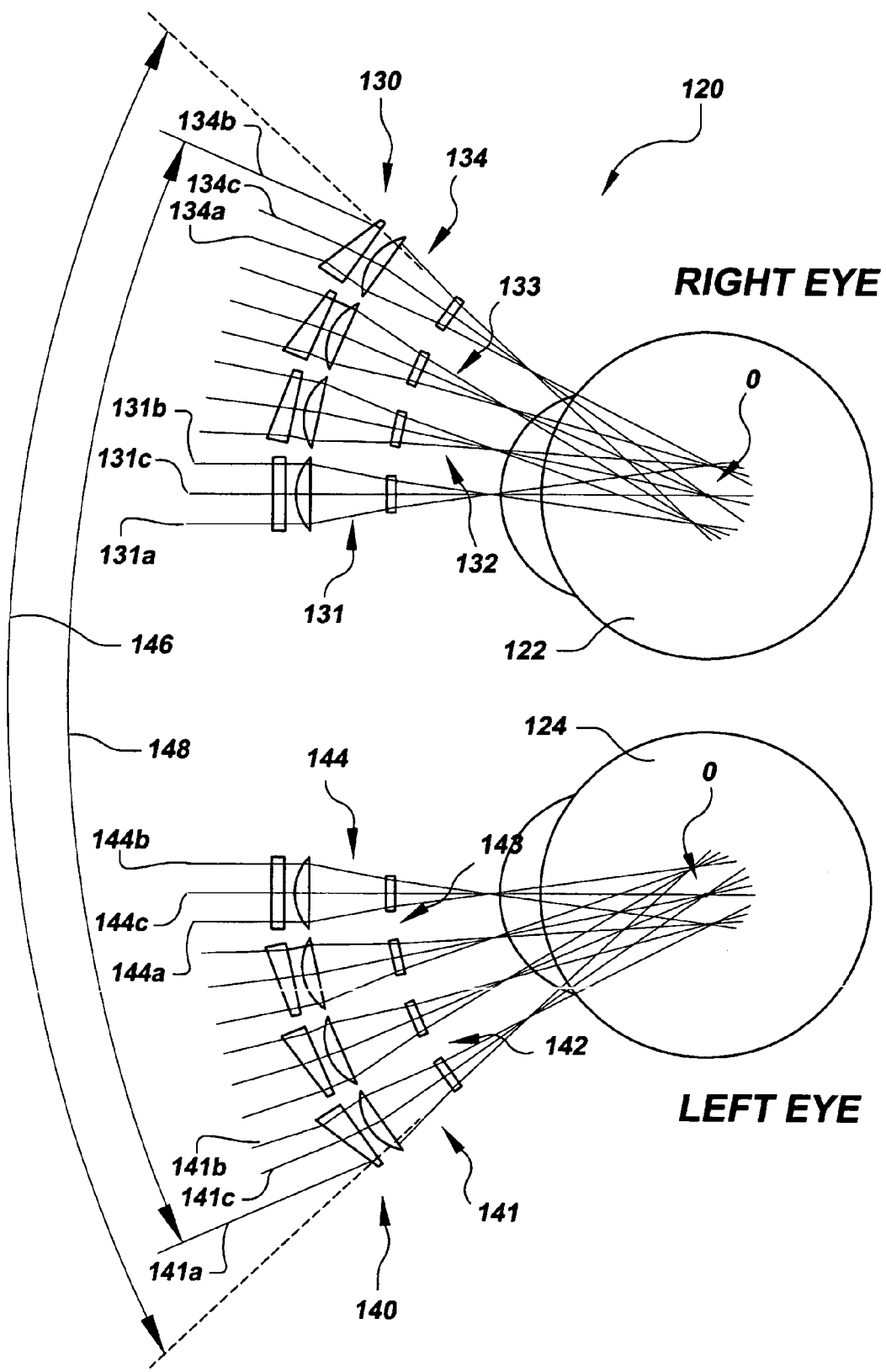
FIG. 6 is a schematic plan view of an arrangement of telescopic lens sets adapted for binocular vision according to another aspect of the invention.

FIG. 6 is a plan view of binocular arrangement or array 120 of telescopic lens sets according to another aspect of the invention. In this aspect of the invention, binocular arrangement 120 is associated with right eye 122 and left eye 124. Arrangement 120 includes a right eye lens set array 130 comprising lens sets 131, 132, 133, and 134; and left eye lens set array 140 comprising lens sets 141, 142, 143, and 144. Lens sets 131-134 and 141-144 each include an ocular lens, an objective lens, and refracting element (for example, a prism), as is typical of other aspects of the invention. The total apparent field of view of lens arrangement 120 is represented by arc 146 and the total real field of view of lens arrangement 120 is represented by arc 148. According to one aspect of the invention, right eye 122 looks through a center telescopic lens set 131 and the right flanking lens sets 132, 133, and 134 to view the field of view to the right. Left eye 124 looks through a center telescopic lens set 144 and the left flanking lens sets 141, 142, and 143 to view the field of view to the left. According to one aspect of the invention, only the center lens sets 131, 144 may have substantially identical fields of view and provide binocular vision. As discussed above and as shown in FIG. 6, the representative edge rays and axial ray associated with each lens set 131 through 134 and 141 through 144 are designated "a," "b," and "c" to facilitate discussion of these rays. Again, not all rays are identified in FIG. 6 for the sake of clarity.

In one aspect, axial rays 144c and 131c may have zero slopes, rays 144a and 131a may have slopes of –u, and rays 144b and 131b have slopes of +u relative to the centerlines of each lens set. Again, the flanking telescopic lens sets may provide the wider peripheral fields which are used to acquire objects of interest that are then viewed through the center lens sets 131, 144 by turning the head toward the objects acquired by the off-center lens sets. According to other aspects of the invention, though FIG. 6 illustrates four lens sets associated with each eye 122, 124, binocular lens array 120 may include any number of lens sets. For example, lens array 120 may only comprise a right eye array 130 or a left eye array 140. In another aspect of the invention, arrays 130 and/or 140 may include 1, 2, 3, 4, 5, or more lens sets each. The optical design parameters of the telescopic lens sets shown in FIG. 6 may be determined in a similar, if not identical, manner as the corresponding lens sets discussed above, that is, in the monocular arrays.

Figure 7:
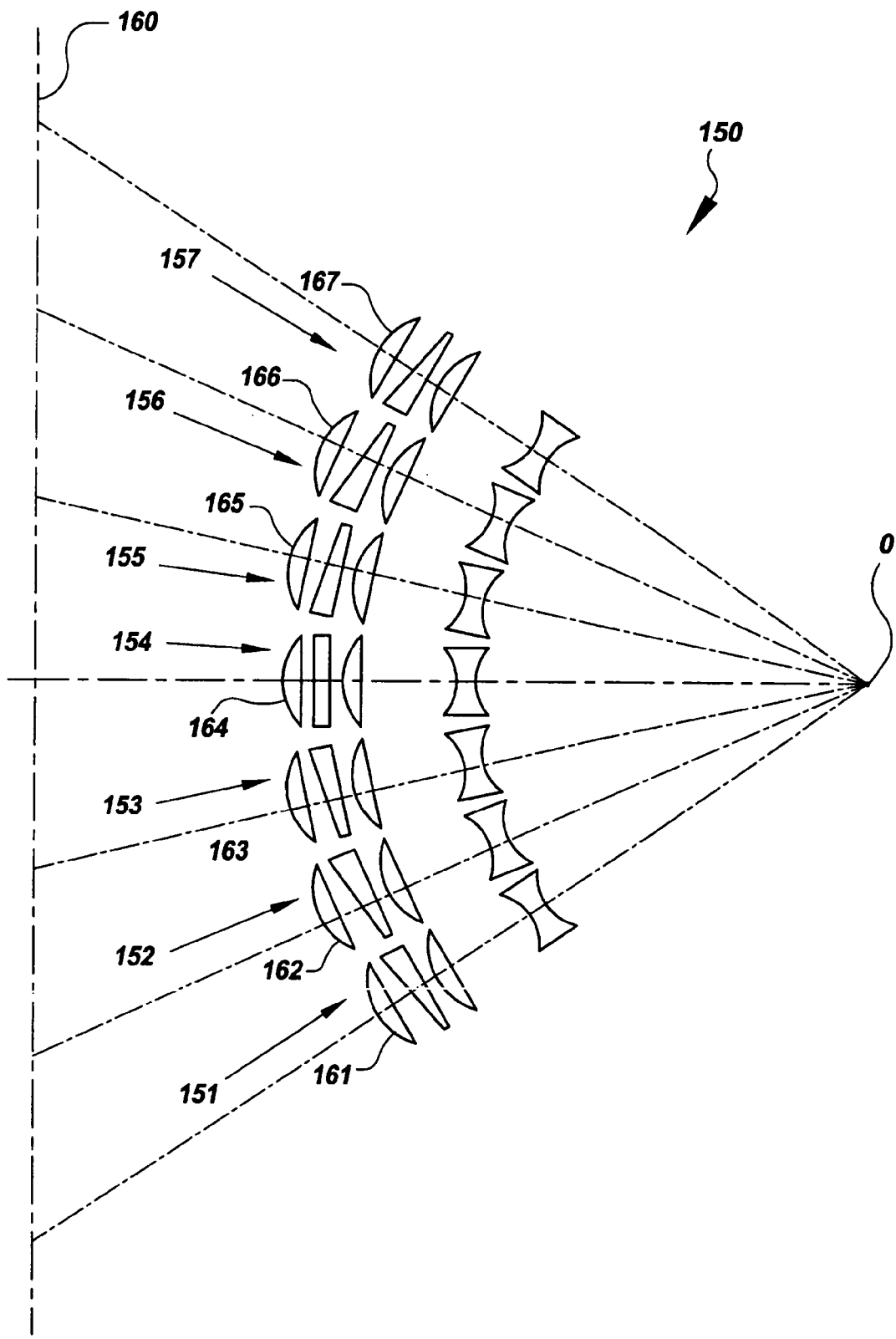
FIG. 7 is a schematic plan view of an arrangement of telescopic lens sets having lens caps that provides a telemicroscopic device according to another aspect of the invention.

Aspects of the invention also provide devices that function as telemicroscopes, that is, devices that can be used to magnify for reading and/or near work. FIG. 7 illustrates a plan view of one telemicroscope device 150 according to one aspect of the invention. In the aspect shown, device 150 includes a plurality of lens sets 151, 152, 153, 154, 155, 156, and 157 for magnifying an object, for example, as indicated by object plane 160, such as, a page of a book. The magnified image is directed toward an eye (not shown) identified by the center of rotation O. Though a total of seven lens sets are shown in FIG. 7, according to aspects of the invention, device 150 may include 2 or more lens sets, for example, as shown in FIGS. 2, 4, and 5. Lens sets 151 through 157 may be similar to other lens sets described previously, for example, lens sets 61 through 67 shown in FIG. 4, and include corresponding ocular lenses, objective lenses, and refracting elements, such as prisms. According to this aspect of the invention, lens sets 151 through 157 may be designed, for example, with appropriate parameters θ, β, φ, etc. discussed above, to provide the substantially contiguous field of view, as also discussed above.

According to this aspect of the invention, at least some lens sets 151 through 157 may also include at least one magnifying optical element 161, 162, 163, 164, 165, 166, and 167, for example, mounted in front of at least some of the refracting elements of lens sets 151 through 157. In one aspect of the invention, magnifying optical elements 161 through 167 may comprise any optical element adapted to collimate light from near object and magnify the light image introduced to lens sets 151 through 157. In one aspect of the invention, substantially all of lens sets 151 through 157 include at least one magnifying element 161 through 167. According to one aspect, magnifying elements 161 through 167 may be a magnifying convex lens or a lens cap. In one aspect of the invention, the separation between the objective and the ocular lenses may be varied, for example, increased, to vary the focus of the lens set. For instance, in one aspect, the separation between lenses may be increased to improve the focus on near objects. However, this may result in less magnification than with the use of lens caps.

According to one aspect of the invention, magnifying elements 161 through 167 each may have dioptric power, that is, the refractive power of the lens. The dioptric power of the magnifying elements 161 through 167 will be dependent upon the desired magnification and/or distance from the object, for example, a book, being viewed. The magnifying element or lens cap may serve as a simple magnifier. According to the conventional art, the magnification of a magnifying lens, M, is given by $M = F/4$, where F is the dioptric power of the magnifying lens. As is also known in the art, the dioptric power of a lens is equal to reciprocal of its focal length in meters. For example, for a dioptric power $F = 8$ diopters, a magnifying lens, for example, lens cap 161, has a magnification of $M = F/4 = 8/4 = 2$, or 2×magnification. According to one aspect of the invention, the magnification power of the magnifying element 161 through 167 is multiplied by the magnifying power of the lens set 151 through 157, respectively, to provide the total magnifying power of the combination of lens set and magnifier element. For example, the total magnifying power of a 2×magnifying lens introduced before a 2×lens set is $M = 2 \times 2 = 4 \times$ magnification. According to aspects of the present invention, magnifying lenses 161 through 167 may have a magnification greater than 1×, or greater than 2×, or more, for example, 4× or 6× or more. In one aspect of the invention, magnifying lens sets 161 through 167 are designed to ensure the desired vignetting of the array of lens sets to which that are applied, for example, to maintain the approximately 100% vignetting desired in one aspect of the invention.

In one aspect, the magnifying optical elements 161 through 167 may have a magnification $M_c$ of $250/f_c$, where $f_c$ is the focal length, in mm, of the magnifying optical element. For example, when $f_c=100$ mm, the magnification of an element is about $M_c=250/100=2.5$. Other magnifications and relationships to focal length may also be used as appropriate. According to one aspect of the invention, elements 161 through 167 may have the same shape as the prisms with which the respective elements are associated, for example, circular or polygonal in shape, for example, hexagonal, and may mount in front of their respective prisms, for example, mounted at a common radius of a circle, cylinder, or sphere.

In one aspect of the invention, magnifying optical elements 161 through 167 are adapted to address the disadvantage of increasing obliquity that can occur with lens caps of telemicroscopes. For example, for telemicroscopes of substantially identical focal length, when observing a flat near object, the image may have been blurred due to an inadequate depth of field. According to one aspect of the invention, to maintain resolution, the focal length of the lens cap may be varied, for example, increased, as a function of its position with respect to the central axis of the array. This may correct the blurred image due to the increased distance to the object for obliquely pointed lens sets, that is, telemicroscopes. For example, for a given focal length of the central lens cap positioned on the centerline of the array, for example, lens cap 164 in FIG. 7, of 100 mm, the focal lengths of adjacent lens caps, 165, 166, and 167, may be 100.5 mm, 102.0 mm, and 104.7 mm, respectively. As a result, the angular magnification of these lens caps may be reduced to less than the nominal magnification. For example, if the nominal magnification of lens set 154 having lens cap 164 is 5.0, the magnification of lens sets 165, 166, and 167 may become 4.98, 4.90, and 4.78, respectively.

Figure 8:
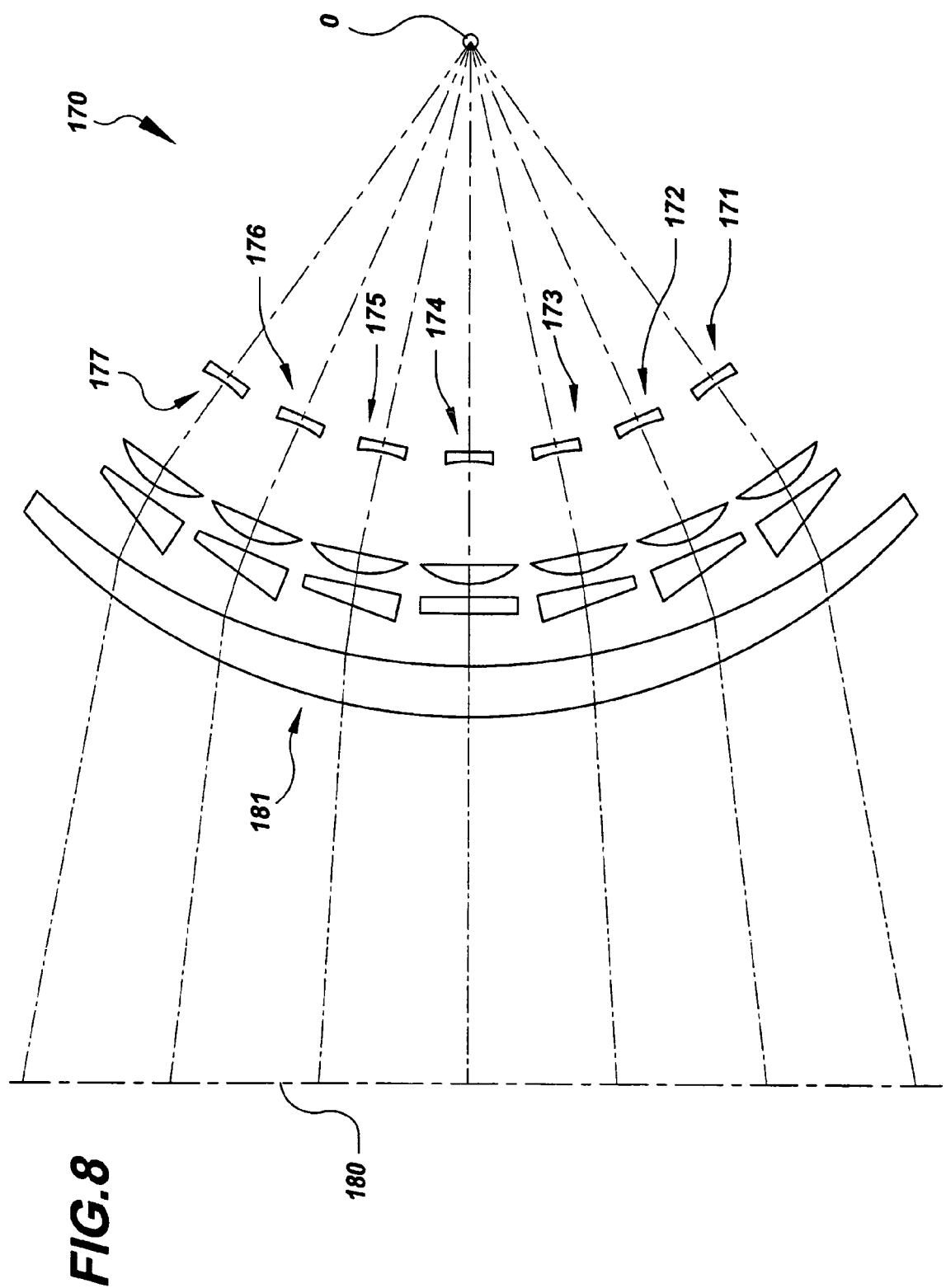
FIG. 8 is a schematic plan view of an arrangement of telescopic lens sets and a single meniscus lens that provides a telemicroscopic device according to another aspect of the invention.

Magnifying optical element 161, 162, 163, 164, 165, 166, and 167, for example, magnifying lenses, may be provided as individual elements for mounting in front of their corresponding prisms and objective lenses. In one aspect of the invention, elements 161 through 167, or a subset thereof, may be provided as an array of elements, for example, a molded array of elements that may be mounted before one or more prisms and objective lenses. These elements may be removably attached whereby they may be removed, for FIG. 8 is a schematic plan view of another telemicroscope device 170 according to another aspect of the invention. In the aspect shown, device 170 includes a plurality of lens sets 171, 172, 173, 174, 175, 176, and 177 for magnifying an object, for example, as indicated by object plane 180, such as, a page of a book. The magnified image is directed toward an eye (not shown) identified by the center of rotation O. Again, as for device 150 shown in FIG. 7, though a total of seven lens sets are shown in FIG. 8, according to aspects of the invention, device 180 may include 2 or more lens sets, for example, as shown in FIGS. 2, 4, and 5. Lens sets 171-177 may be similar to other lens sets described previously, for example, lens sets 61 through 67 shown in FIG. 4, and include corresponding ocular lenses, objective lenses, and refracting elements, such as prisms. According to this aspect of the invention, lens sets 171 through 177 may be designed, for example, with appropriate parameters θ, β, and φ discussed above, to provide the substantially contiguous field of view, as also discussed above.

According to this aspect of the invention, one or more meniscus lenses 181 may be positioned before and refract at least some light entering at least some lens sets in the array of lens sets 171 through 177 to provide a telemicroscopic device. The dioptric power of the meniscus lens 181 will be dependent upon the desired magnification and/or distance from the object 180, for example, a book, being viewed. According to aspects of the invention, meniscus lens 181 may have a magnification power greater than 1×, or greater than 2×, or more, for example, 4× or 6×. The corresponding refractive powers of meniscus lens 181 may be 8, 16, and 32 diopters. For a single array of lens sets shown in FIG. 8, the shape of the meniscus lens may be wide enough to extend to the extreme azimuthal object space edge rays of at least some of, preferably all of, lens sets 171 and 177. The height of the meniscus lens 181 may cover at least some of, again, preferably, all of, the extreme elevation object space edge rays of all ray sets. For example, see the front elevation view in FIG. 11 of a lens set that meniscus lens 181 may cover both the azimuthal and elevation object space of, according to one aspect of the invention.

Figure 9:
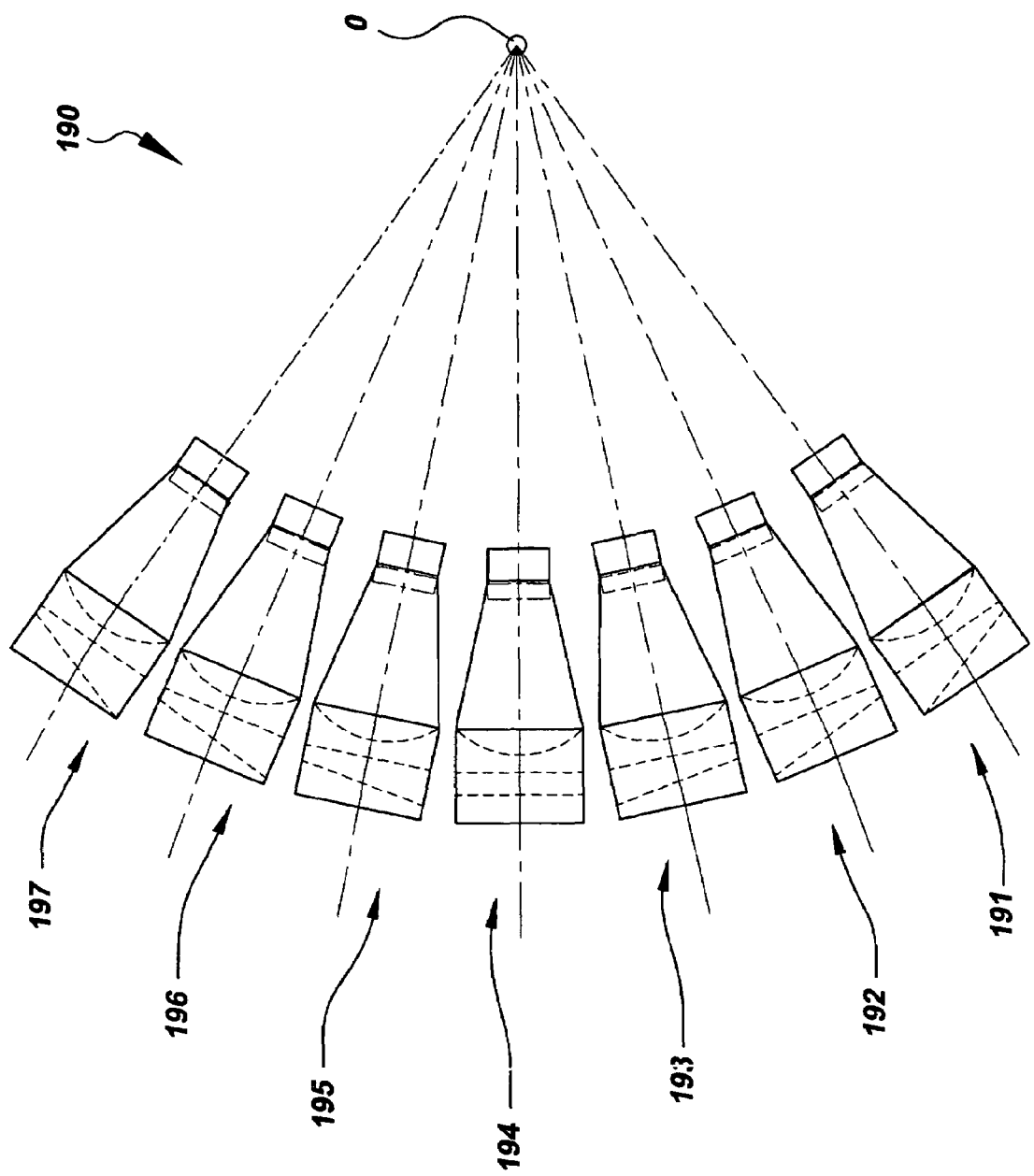
FIG. 9 is a schematic plan view of an arrangement of telescopic lens set housings according to one aspect of the invention.

According to aspects of the present invention, each telescopic lens set in an array may be mounted in an individual housing as shown in FIG. 9. According to one aspect of the invention, by enclosing the lens sets in housings, the sides of adjacent set housings block "crosstalk", that is, the housings may minimize or prevent light from the FOV of a given lens set from entering an adjoining lens set. FIG. 9 is a plan view of an arrangement 190 telescopic lens set housings 191, 192, 193, 194, 195, 196, and 197. The magnified image is directed toward an eye identified by the center of rotation O. Though a total of seven lens set housings are shown in FIG. 9, according to aspects of the invention, arrangement 190 may include 2 or more lens set housings, for example, 2, 4, 5, 8 or more housings. Lens set housings 191 through 197 may include lens sets similar to other lens sets described previously, for example, lens sets 61 through 67 shown in FIG. 4, and may include corresponding ocular lenses, objective lenses, and refracting elements, such as prisms (all shown in phantom). Lens sets 191 through 197 may also include one or more magnifying elements, such as, lens caps as described with respect to FIG. 7. According to this aspect of the invention, lens sets in lens set housings 191 through 197 may be designed, for example, with appropriate parameters θ, β, φ, etc., discussed above, to provide the substantially contiguous field of view, as discussed above. According to one aspect of the invention, the lens sets in lens set housings 191 through 197 (and any other telescopic lens sets disclosed herein) may be set to afocal by adjusting the spacing between the respective objective and ocular lenses. In one aspect, the arrangement or array 190 may be housed in a support structure or base (see FIGS. 10, 11, and 12) that may allow fine or gross azimuthal angular and/or fine or gross altitudinal angular adjustments of the axes of the individual lens set housings 191 through 197 to optimize contiguity. The arrangement or array 190 may be enclosed by a cover that attaches to the support structure or base.

FIGS. 10, 11, and 12 illustrate one optical device 200 for mounting a plurality of lens sets according to one aspect of the invention. FIG. 10 is a top plan view of a the device 200 having a housing 210 and plurality of lens set housings 201, 202, 203, 204, 204, 205, 206, and 207 (all shown in phantom), for example, lens set housing similar to lens set housings 191 through 197 shown in FIG. 9. FIG. 11 is a front elevation view of optical device 200 shown in FIG. 10 as viewed along lines 11-11 shown in FIG. 10. Again, though a total of seven lens set housings are shown in FIG. 10, according to aspects of the invention, device 200 may include 2 or more lens set housings, for example, 2, 4, 5, 8 or more housings. Lens set housings 201 through 207 may include lens sets similar to other lens sets described previously, for example, lens sets 61 through 67 shown in FIG. 4, and may include corresponding ocular lenses, objective lenses, and refracting elements, such as prisms. Lens sets 201 through 207 may also include one or more magnifying elements, such as, lens caps as described with respect to FIG. 7. According to this aspect of the invention, lens sets in lens set housings 201 through 207 may be designed, for example, with appropriate parameters θ, β, φ, etc., discussed above, to provide the substantially contiguous field of view, as discussed above. Housing 210 includes a base 212 and a cover 214 mounted to base 212, for example, by means of mechanical fasteners.

FIG. 12 is a cross-sectional view of device 200 shown in FIGS. 10 and 11 as viewed along lines 12-12 in FIG. 11. FIG. 12 illustrates a cross-section of base 212, cover 214, and lens set housing 202. As shown in FIG. 12, as is typical of lens set housings 201 through 207, lens set housing 202 may include a lens housing 220 having an ocular lens 222, an objective lens 224, a prism 226, and optionally a lens cap 228. As shown in FIG. 12, lens set housing 202 may be supported by a lens set holder 230. Lens holder 230 may be mounted to base 212 by conventional means, for example, an adhesive, welding, or mechanical fasteners, such as, one or more screws 213.

As shown in FIG. 11, in one aspect of the invention, lens set holders 201 through 207 and the elements they contain, for example, the lens and prisms, may be rectangular in shape. In other aspects of the invention, lens sets 201 through 207 and the elements they contain may be circular, oval, or polygonal in shape, for example, triangular, square, pentagonal, or hexagonal, among other shapes.

Figure 13:
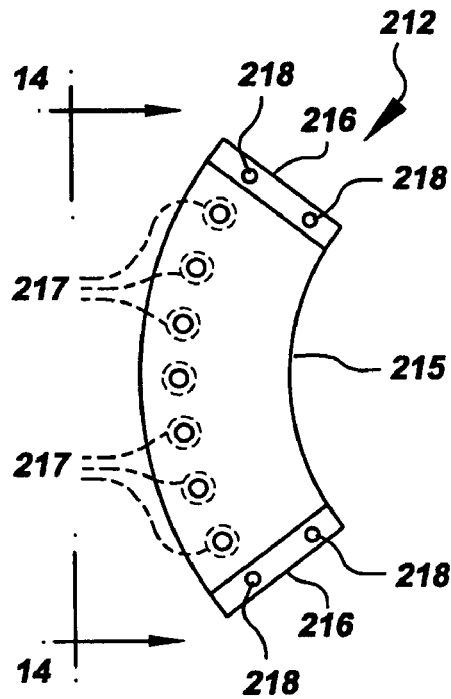
FIG. 13 is a top plan view of the base of the optical device shown in FIGS. 10, 11, and 12.
Figure 14:
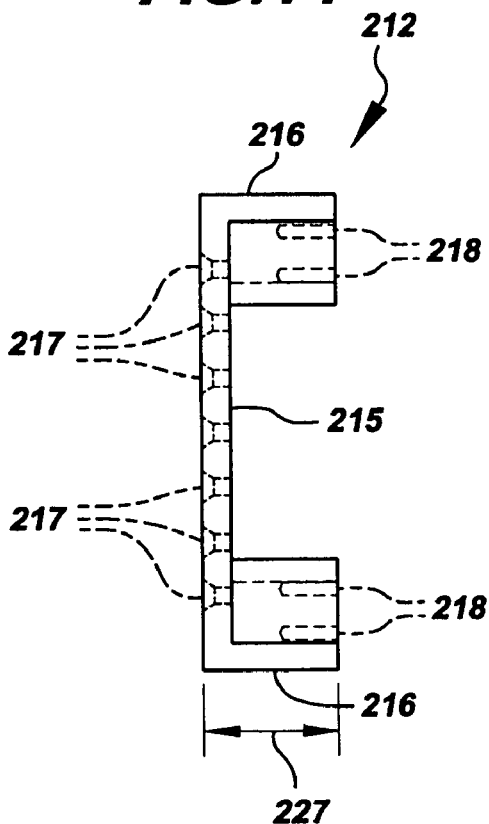
FIG. 14 is a side elevation view of the base shown in FIG. 13 as viewed along lines 14-14 in FIG. 13.

FIGS. 13, 14, 15, and 16 illustrate detailed views of base 212 and cover 214 according to one aspect of the present invention. FIG. 13 is a top plan view of base 212. FIG. 14 is a side elevation view of base 212 as viewed along lines 14-14 in FIG. 13. Base 212 includes a bottom plate 215 and two side plates 216. Base 212 may comprise an integral construction, for example, machined from a single block, forged, cast, or welded, or separate parts assembled by an adhesive or mechanical fasteners. Base 212 may be adapted to mount and position the lens set housings, for example, lens set housings 201 through 207 shown in FIGS. 10 and 11. In one aspect, base 212 includes a plurality of holes 217 for mounting lens set housings 201 through 207 to base 212, for example, a plurality of counter-sunk through holes. Side plates 216 may also be adapted to mount cover 214, for example, side plates 216 may include one or more threaded holes 218 adapted to accepted threaded fasteners (not shown).

Base 212 may be metallic or non-metallic. For example, base 212 may be made from one or more of the following metals: iron, steel, stainless steel, aluminum, titanium, nickel, magnesium, brass, bronze, or any other structural metal. Base 212 may also be made from one or more the following plastics: polyamide (PA), for example, nylon, polyethylene (PE), polypropylene (PP), polyester (PE), polytetraflouroethylene (PTFE), acrylonitrile butadiene styrene (ABS), and polyvinylchloride (PVC), among other plastics.

Figure 15:
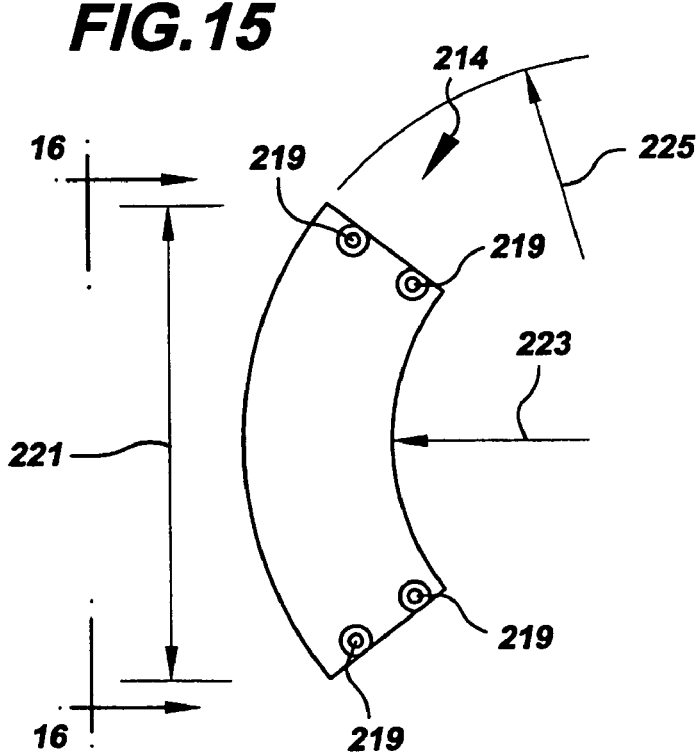
FIG. 15 is a top plan view of the cover of the optical device shown in FIGS. 10, 11, and 12.
Figure 16:
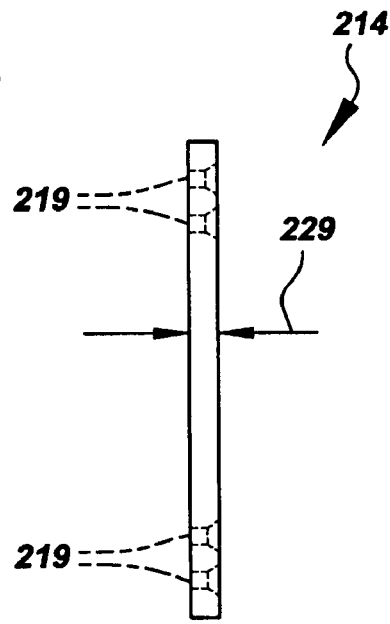
FIG. 16 is a side elevation view of the cover shown in FIG. 15 as viewed along lines 16-16 in FIG. 15.

FIG. 15 is a top plan view of cover 214. FIG. 16 is a side elevation view of cover 214 as viewed along lines 16-16 in FIG. 15. Cover 214 may include a plurality of holes 219 for mounting cover 214 to base 212, for example, a plurality of counter-sunk through holes. Cover 214 may be metallic or non-metallic and made from one or more of the metals or plastics listed above with respect to base 212.

The size of base 212 and cover 214 may vary depending upon the size of the optics mounted therein. In one aspect of the invention, base 212 and cover 214 may have a length 221 of between about 25 mm and about 3 meters, typically, between about 50 mm and about 100 mm, for example, about 60 mm. In one aspect of the invention, base 212 and cover 214 may have an inner radius 223 of between about 5 mm and about 250 mm, typically, between 20 mm and about 40 mm, for example, about 29 mm. In one aspect of the invention, base 212 and cover 214 may have an outer radius 225 of between about 5 mm and about 250 mm, typically, between 35 mm and about 55 mm, for example, about 44 mm. In one aspect of the invention base 212 may have a height 227 of between about 5 mm and about 250 mm, typically, between about 5 mm and about 25 mm, for example, about 13 mm. In one aspect of the invention cover 214 may have a thickness 229 of between about 1 mm and about 50 mm, typically, between about 1 mm and about 5 mm, for example, about 3 mm.

Figure 17:
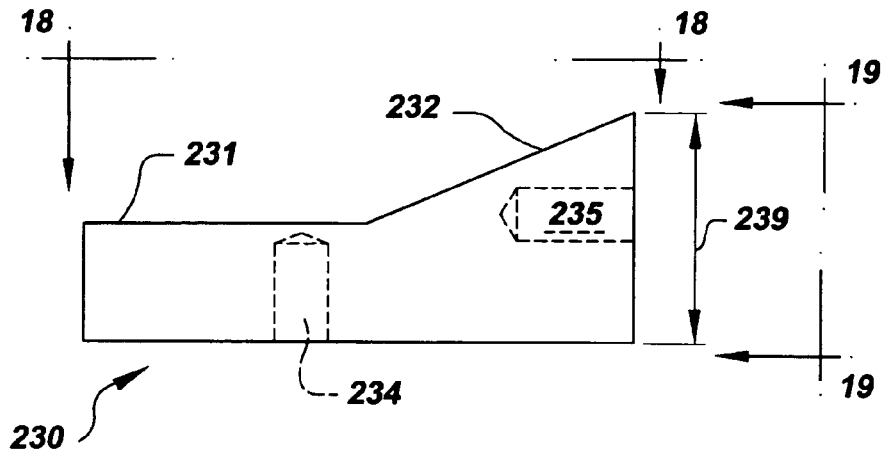
FIG. 17 is a side elevation view the lens holder shown in FIG. 12 according to one aspect of the invention.
Figure 18:
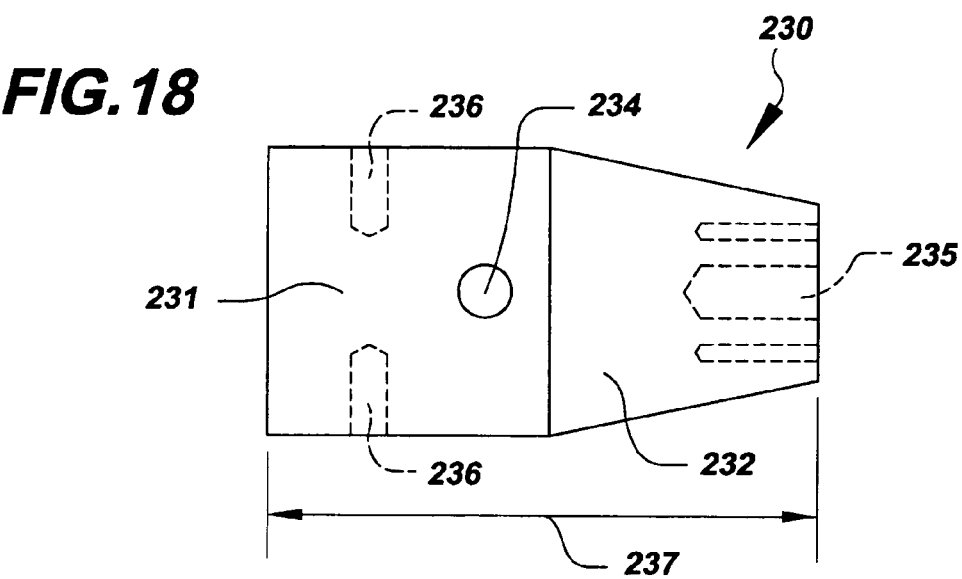
FIG. 18 is a plan view of the lens holder shown in FIG. 17 as viewed along lines 18-18 in FIG. 17.
Figure 19:
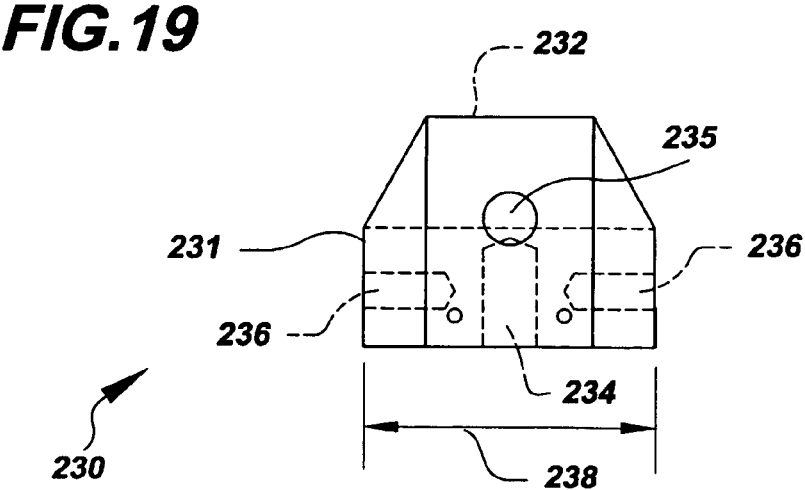
FIG. 19 is a side elevation view of the lens holder shown in FIG. 17 as viewed along lines 19-19 in FIG. 17.

FIGS. 17, 18, and 19 illustrate views of lens holder 230 shown in FIG. 12 according to another aspect of the invention. FIG. 17 is a side elevation view of lens holder 230. FIG. 18 is a plan view of lens holder 230 as viewed along lines 18-18 in FIG. 17. FIG. 19 is a side elevation view of lens holder 230 as viewed along lines 19-19 in FIG. 17. According to one aspect of the invention, lens holder 230 includes a first section 231 adapted to receive the objective lens end of a lens set housing, such as, lens set housings 201 through 207 of FIG. 10, and a second section 232 adapted to receive the ocular lens end of a lens set housing. Section 232 may comprise a slope having an angle of between about 10 and 50 degrees, depending upon the size of the optics being used. In one aspect, section 232 comprises an angle of between about 20 degrees and about 30 degrees, for example, about 22 degrees. Sections 231 and 232 may included rounded depressions (not shown) adapted to receive a circular lens set housing. Lens holder 230 may include one or more holes, for example, one or more threaded holes by which lens holder 230 may be mounted to housing 210, for example, threaded holes 234, 235, and 236 (shown in phantom).

The size of lens holder 230 may vary depending upon the size of the optics mounted therein. In one aspect of the invention, lens holder 230 may have a length 237 of between about 5 and about 50 mm, typically, between about 8 and about 16 mm, for example, about 11 mm. In one aspect of the invention, lens holder 230 may have a width 238 of between about 3 and about 25 mm, typically, between about 5 and about 12 mm, for example, about 7 mm. In one aspect of the invention, lens holder 230 may have a height 239 of between about 2 and about 25 mm, typically, between about 3 and about 7 mm, for example, about 5 mm. Lens holder 230 may be metallic or non-metallic, for example, lens holder 230 may be made from one or more of the metals or plastics identified above with respect to base 212.

Figure 20:
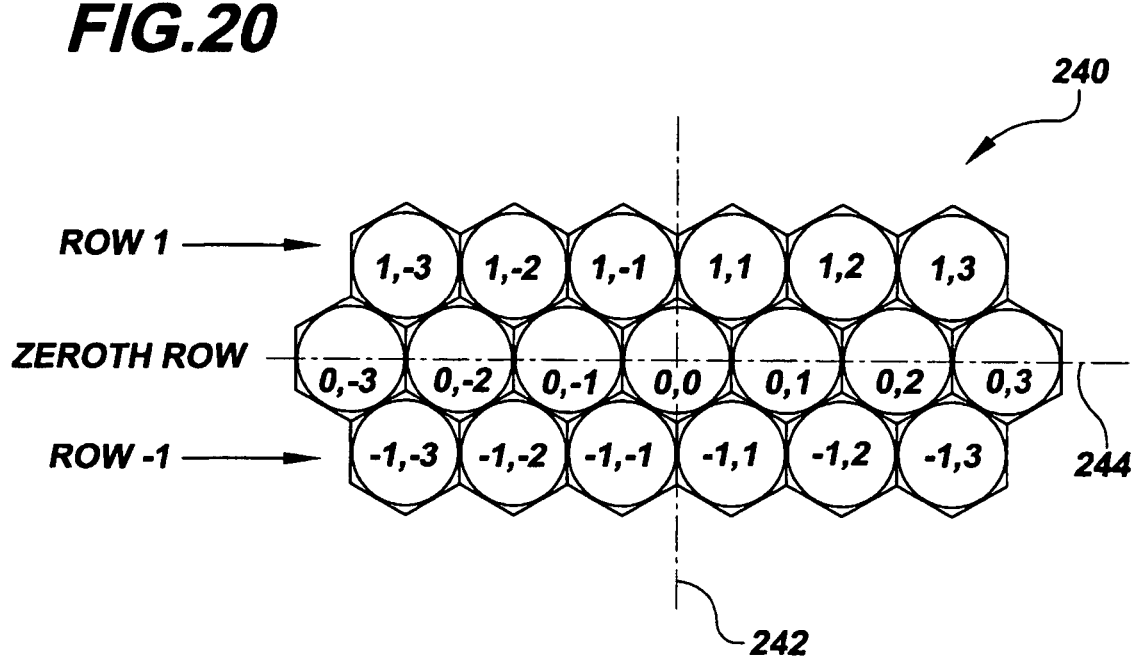
FIG. 20 is a front development elevation view of an arrangement of multiple rows of telescopic lens sets according to another aspect of the invention.

According to one aspect of the invention, a lens set arrangement or array may be provided having a plurality of rows of lens sets. FIG. 20 is a front development elevation view of an array or arrangement 240 of multiple rows of telescopic lens sets according to one aspect of the invention. Again, though a total of seven lens are shown in each of three rows in FIG. 20, according to aspects of the invention, array 240 may include 2 or more lens sets per row, for example, 3, 4, 5, 8 or more lens sets per row, and 2 or more rows. The lens sets in array 240 may include lens sets similar to other lens sets described previously, for example, lens sets 61 through 67 shown in FIG. 4, and may include corresponding ocular lenses, objective lenses, and refracting elements, such as prisms. The lens sets in array 240 may also include one or more magnifying elements, such as, lens caps, as described with respect to FIG. 7. According to this aspect of the invention, lens sets in array 240 may be designed, for example, with appropriate parameters θ, β, φ, etc., discussed above, to provide the substantially contiguous field of view, as discussed above.

Figure 21:
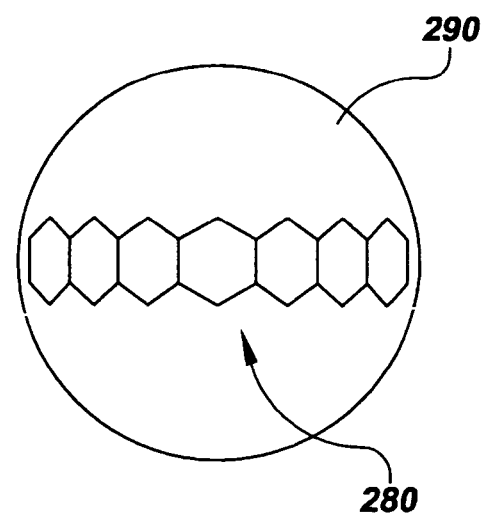
FIG. 21 is schematic front elevation view of a row of telescopic lens sets as positioned about a spherical surface according to another aspect of the invention.

FIG. 20 comprises a development for ease of illustration. Though aspects of the invention may provide an array 240 having a plurality of lens sets arranged in a planar fashion, in one aspect, the array 240 may be arranged whereby the lens sets are arranged in an array having a radius, for example, as shown in FIGS. 3, 4, and 7. The radiused array 240 may be arranged in a cylindrical fashion, that is, where the lens sets are arranged as if mounted on the surface of a circular cylinder, or in spherical fashion, wherein the lens sets are arranged as if they were mounted on the surface of a sphere, for example, having the sphere's center coincident with the center of rotation of the eye. FIG. 21 is schematic front elevation view of a row of telescopic lens sets 280 as positioned in a spherical fashion about sphere 290 according to one aspect of the invention. The radius of sphere 290 may vary from between about 5 mm and about 250 mm, typically, between 35 mm and about 55 mm, for example, about 44 mm.

In order to facilitate the identification of each lens set in FIG. 20, each lens set is identified by a two integer code (x, y), where x is the row of the lens set and y is the relative position of the lens set in each row with respect to the vertical centerline 242 of array 240. Using this nomenclature, the middle row of the array aligned along horizontal centerline 244 is designated the "0" row. Also, as shown in FIG. 20, the center lens set is designated (0, 0) and the right-most lens set in the upper row is designated (1, 3).

In one aspect of the invention, the lens set housings of the lens sets in FIG. 20 may be shaped to conform to adjacent housings in the array. For example, in the array shown, the housings of the lens sets are hexagonal in shape to provide for optimum compatibly and packing of the lens set housings. In one aspect of the invention, the housings may also be circular, oval, triangular, square, rectangular, or any polygonal shape. As shown in FIG. 20, the lens sets may be mounted in a staggered relationship relative to adjacent lens sets. In another aspect of the invention, the lens sets may be arranged directly on top of the lens sets above and below, whereby the centerlines of the lens sets are substantially aligned with the centerlines of the lens sets above and below. In another aspect, the centerlines of lens sets in adjacent rows may not be aligned.

In the spherical array 280 of FIG. 21 the lens sets and prisms above and below the row of lens sets shown may require progressive changes in shape and orientation due their positioning on tilted great circles of sphere 290.

Aspects of the invention provide methods and devices for improving the vision of both those of normal vision and the visually impaired by providing a wider field of view than provided by the prior art, and in some aspects, a contiguous wide field of view. Aspects of the invention may be used to facilitate the acquisition of targets of interest, for example, street signs or driving hazards, and allow the user to turn and view the target. Aspects of the invention may be used for opera-type glasses and provide a wider field of view of the stage, the track, the court, or the field for the opera or theater lover or sports fan. The wider field of view provided by aspects of the present invention may also improve outdoor tracking or viewing, such as in military surveillance or bird watching. Other applications of aspects of the invention will be apparent to those familiar with the art.

While several aspects of the present invention have been described and depicted herein, alternative aspects may be provided by those skilled in the art to accomplish the same objectives. Accordingly, it is intended by the appended claims to cover all such alternative aspects as fall within the true spirit and scope of the invention.

The invention claimed is:

1. A wide field visual optical device comprising:
   a plurality of Galilean telescopic lens sets, each telescopic lens set comprising an objective lens and an ocular lens positioned in telescopic relationship; and
   a plurality of refracting optical elements positioned in front of at least some of the objective lenses, the refracting optical elements adapted to at least partially redirect light rays toward at least some of the objective lenses to provide a substantially contiguous wide field of view.

2. The optical device as recited in claim 1, wherein the plurality of refracting optical elements comprise prisms.

3. The optical device as recited in claim 1, wherein the plurality of telescopic lens sets comprise at least three telescopic lens sets.

4. The optical device as recited in claim 3, wherein the at least three telescopic lens sets are positioned to direct light to an eye of a user.

5. The optical device as recited in claim 3, wherein the plurality of telescopic lens sets comprise at least 5 telescopic lens sets.

6. The optical device as recited in claim 1, wherein the plurality of telescopic lens sets are positioned in a single plane.

7. The optical device as recited in claim 6, wherein each objective lens of the plurality of telescopic lens sets is positioned on a common circle of radius $R_c$.

8. The optical device as recited in claim 1, wherein each objective lens of the plurality of telescopic lens sets is positioned on a common sphere of radius $R_s$.

9. The optical device as recited in claim 1, wherein the optical device further comprises at least one magnifying optical element positioned before at least one of the objective lenses, the magnifying optical element adapted to magnify a light image introduced to the lens sets.

10. The optical device as recited in claim 9, wherein the at least one magnifying optical element comprises at least one magnifying convex lens.

11. The optical device as recited in claim 9, wherein the at least one magnifying optical element comprises at least one meniscus lens.

12. The optical device as recited in claim 1, wherein the optical device provides a substantially contiguous wide field of view of at least 70 degrees.

13. The optical device as recited in claim 1, wherein the refracting optical elements at least partially redirect light rays wherein magnified fields in image space appear to a viewer to be adjacent to each other.

14. A method of providing wide field magnification, the method comprising:
   providing a plurality of objective lenses;
   positioning a plurality of ocular lenses in Galilean telescopic relationship with the plurality of objective lenses wherein an image of an object visually viewed by a user through the objective lenses and ocular lenses is magnified; and
   refracting light from the object before the light enters the objective lenses wherein a viewer visually viewing the object through the plurality of ocular lenses views a substantially contiguous magnified wide field view of the object.

15. The method as recited in claim 14, wherein refracting light from the object comprises positioning a plurality of refracting optical elements in front of at least some of the objective lenses.

16. The method as recited in claim 14, wherein the refracting optical elements comprises optical prisms.

17. The method as recited in claim 14, further comprising magnifying light from the object prior to refracting light from the object.

18. The method as recited in claim 17, wherein magnifying light comprises positioning at least one magnifying lens in front of at least one of the objective lenses.

19. The method as recited in claim 14, wherein positioning the plurality of ocular lenses with the plurality of objective lenses comprises positioning at least three ocular lenses with at least three objective lenses to direct light to an eye of a user.

20. A wide field optical magnification system comprising:
   a plurality of Galilean telescopic lens sets, each telescopic lens set comprising an objective lens, an ocular lens positioned in telescopic relationship with the objective lens, and a prism positioned before the objective lens; and
   a support structure adapted to position the plurality of lenses sets;
   wherein at least some of the prisms comprise a prism angle β chosen to refract light toward at least some of the objective lenses to provide a substantially contiguous magnified visual wide field of view to a user.

21. The wide field magnification system as recited in claim 20, wherein at least one of the telescopic lens sets comprise a half-field-of-view angle, u; an aperture stop; an eye relief; a separation between the ocular lens and the objective lens; and vignetting; wherein u is governed substantially by:

$$\tan u = \frac{(D_0/(2M)) + (V - 0.5)/D_a}{(eM) + d}$$

wherein $D_o$ is the width of the objective lens; M is the magnification of the lens set; $D_a$ is the diameter of the aperture stop; e is the eye relief; d is the separation; and V is vignetting of the lens set.

22. The wide field magnification system as recited in claim 21, wherein vignetting, V, ranges from about 50% to about 100%.

23. The wide field magnification system as recited in claim 20, wherein at least one of the telescopic lens sets comprise an ocular lens diameter, $D_e$; an eye relief; a separation between the ocular lens and the objective lens; and vignetting; wherein $D_e$ is governed substantially by:

$$D_e = 2\frac{[eD_0/2 - (V - 0.5)dD_a]}{(eM) + d}$$

wherein $D_o$ is the width of the objective lens; M is the magnification of the lens set; $D_a$ is the diameter of the aperture stop; e is the eye relief; d is the separation; and V is vignetting of the lens set.

24. The wide field magnification system as recited in claim 20, wherein at least one of the prisms comprises a prism deviation angle β and an index of refraction n, and wherein the prism angle β is chosen to substantially satisfy the equation $$\tan\beta = \frac{\sin\delta}{n - \cos\delta}.$$

25. The wide field magnification system as recited in claim 24, wherein at least one of the telescopic lens sets comprises alignment angle φ and an object space axial array angle θ, wherein δ is substantially equal to the difference φ−θ.

26. The wide field magnification system as recited in claim 20, wherein the support structure comprises a lens set housing and at least one lens set support positioned in the lens set housing.

27. The wide field magnification system as recited in claim 20, wherein the plurality of Galilean telescopic lens sets comprise at least three lens sets positioned to direct light to an eye of a user.

* * * * *

UNITED STATES PATENT AND TRADEMARK OFFICE
CERTIFICATE OF CORRECTION

PATENT NO. : 7,477,451 B2  Page 1 of 1
APPLICATION NO. : 10/991917
DATED : January 13, 2009
INVENTOR(S) : Katz It is certified that error appears in the above-identified patent and that said Letters Patent is hereby corrected as shown below:

Claim 24, Col. 24, Line 5: Delete "angle β" and insert -- angle δ --

Signed and Sealed this

Twenty-eighth Day of April, 2009

JOHN DOLL
*Acting Director of the United States Patent and Trademark Office*